(12) United States Patent
Kitagawa

(10) Patent No.: US 11,879,730 B2
(45) Date of Patent: Jan. 23, 2024

(54) LASER INTERFEROMETER HAVING A VIBRATOR TO MODULATE LIGHT FOR DISPLACEMENT AND VIBRATION VELOCITY MEASUREMENT

(71) Applicant: SEIKO EPSON CORPORATION, Tokyo (JP)

(72) Inventor: Jun Kitagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/410,798

(22) Filed: Aug. 24, 2021

(65) Prior Publication Data

US 2022/0065613 A1 Mar. 3, 2022

(30) Foreign Application Priority Data

Aug. 27, 2020 (JP) .................................. 2020-143297

(51) Int. Cl.
| | |
|---|---|
| *G01B 9/02* | (2022.01) |
| *G01B 9/02002* | (2022.01) |
| *G01B 9/02056* | (2022.01) |
| *G02B 5/04* | (2006.01) |

(52) U.S. Cl.
CPC ..... *G01B 9/02002* (2013.01); *G01B 9/02056* (2013.01); *G01B 9/02083* (2013.01); *G01B 2290/70* (2013.01); *G02B 5/04* (2013.01)

(58) Field of Classification Search
CPC ............ G01B 9/02002; G01B 9/02056; G01B 9/02083; G01B 2290/70; G01B 9/0201; G01B 9/02045; G02B 5/04; G02B 26/06; G02B 27/283; G01P 3/366; G01H 9/00
See application file for complete search history.

(56) References Cited

U.S. PATENT DOCUMENTS

| | | | |
|---|---|---|---|
| 6,608,717 B1 * | 8/2003 | Medford .............. | G02B 21/002 359/368 |
| 2010/0141954 A1 * | 6/2010 | Kobayashi ......... | G01B 9/02087 356/479 |
| 2022/0065613 A1 * | 3/2022 | Kitagawa ........... | G01B 9/02056 |

FOREIGN PATENT DOCUMENTS

| | | |
|---|---|---|
| JP | H0238889 A | 2/1990 |
| JP | H0954293 A | 2/1997 |
| JP | 2007285898 A | 11/2007 |

\* cited by examiner

*Primary Examiner* — Hwa Andrew Lee
(74) *Attorney, Agent, or Firm* — CHIP LAW GROUP

(57) ABSTRACT

A laser interferometer includes a light source that emits first laser light, an optical modulator that includes a vibrator and modulates the first laser light by using the vibrator to generate second laser light including a modulated signal, a photodetector that receives interference light between third laser light including a sample signal generated by reflecting the first laser light on an object and the second laser light to output a light reception signal, and an optical path length variable section that changes an optical path length of an optical path through which the third laser light propagates.

8 Claims, 13 Drawing Sheets

LASER INTERFEROMETER HAVING A VIBRATOR TO MODULATE LIGHT FOR DISPLACEMENT AND VIBRATION VELOCITY MEASUREMENT

The present application is based on, and claims priority from JP Application Serial Number 2020-143297, filed Aug. 27, 2020, the disclosure of which is hereby incorporated by reference herein in its entirety.

BACKGROUND

1. Technical Field

The present disclosure relates to a laser interferometer.

2. Related Art

JP-A-2007-285898 discloses a laser vibrometer, as a device for measuring the vibration velocity of an object, that irradiates the object with laser light and measures the vibration velocity based on the scattered laser light subjected to Doppler shift. In the laser vibrometer, the Doppler signal contained in the scattered laser light is extracted by using the optical heterodyne interferometry.

Further, in the laser vibrometer disclosed in JP-A-2007-285898, a piezo element or a quartz crystal resonator of which the vibration frequency is variable by changing the voltage is used, in which frequencies are shifted by irradiating the vibrators with laser light. By using the laser light including the modulated signal of which the frequency is shifted in this way as reference light, the Doppler signal is demodulated from the scattered laser light. By using the Doppler signal obtained in this way, the vibration velocity of the object can be measured.

Meanwhile, JP-A-2-38889 discloses that a sine wave signal is applied to an optical modulator, a reference light beam of which the frequency is shifted in a sine wave shape with respect to a light beam and a reflected light beam obtained by irradiating an object with the light beam are received by a photodetector, and arithmetic processing on a light reception signal is performed. Further, JP-A-2-38889 discloses that, even when the frequency of the reference light beam is shifted over time, a signal derived from the object (beat signal) can be obtained, and a displacement and vibration velocity of the object can be obtained by allowing the beat signal to pass through an FM demodulation circuit.

In the method disclosed in JP-A-2-38889, a demodulation process is performed that splits the light reception signal into two, applies separate arithmetic processing, and then adds them to erase an unnecessary term of the signal and finally extract the beat signal. However, when the vibration state of the object does not satisfy a predetermined condition, there is a problem that the beat signal cannot be demodulated with high accuracy and the displacement and vibration velocity of the object cannot be obtained with high accuracy.

SUMMARY

A laser interferometer according to an application example of the present disclosure includes: a light source that emits first laser light; an optical modulator that includes a vibrator and modulates the first laser light by using the vibrator to generate second laser light including a modulated signal; a photodetector that receives interference light between third laser light including a sample signal generated by reflecting the first laser light on an object and the second laser light to output a light reception signal; and an optical path length variable section that changes an optical path length of an optical path through which the third laser light propagates.

A laser interferometer according to another application example of the present disclosure includes: a light source that emits first laser light; an optical modulator that includes a vibrator and modulates the first laser light by using the vibrator to generate second laser light including a modulated signal; a photodetector that receives interference light between third laser light including a sample signal generated by reflecting the first laser light on an object and the second laser light to output a light reception signal; and an optical path length variable section that changes an optical path length of an optical path through which the second laser light propagates.

DESCRIPTION OF EXEMPLARY EMBODIMENTS

Hereinafter, the laser interferometer according to the present disclosure will be described in detail based on the embodiments shown in the accompanying drawings.

Figure 1:
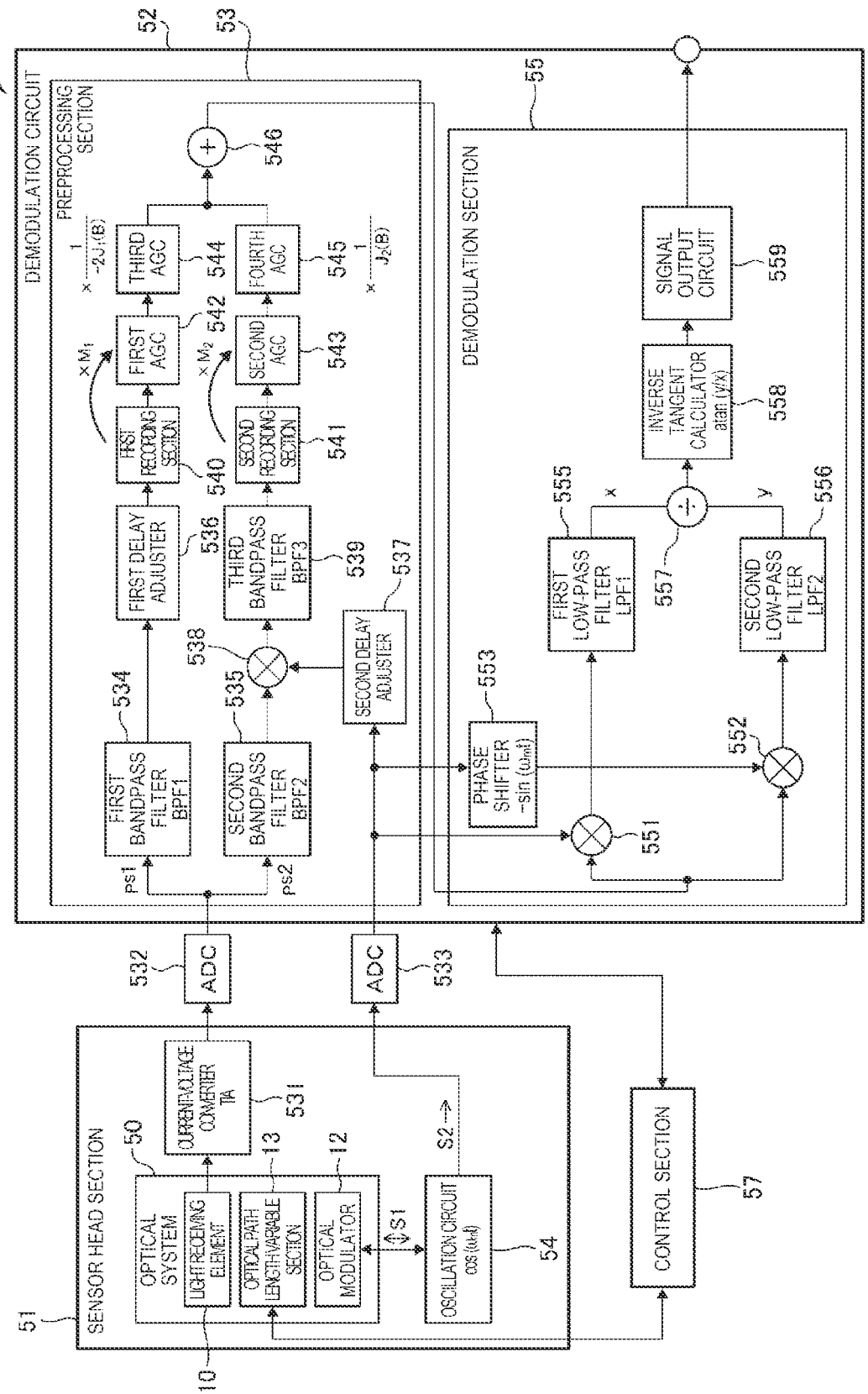
FIG. 1 is a functional block diagram showing a laser interferometer according to an embodiment.

FIG. 1 is a functional block diagram showing a laser interferometer according to an embodiment.

A laser interferometer 1 shown in FIG. 1 has a sensor head section 51 provided with an optical system 50, a demodulation circuit 52 to which a light reception signal from the optical system 50 is input, an oscillation circuit 54 that outputs a reference signal to the demodulation circuit 52, and a control section 57.

1. Sensor Head Section

Figure 2:
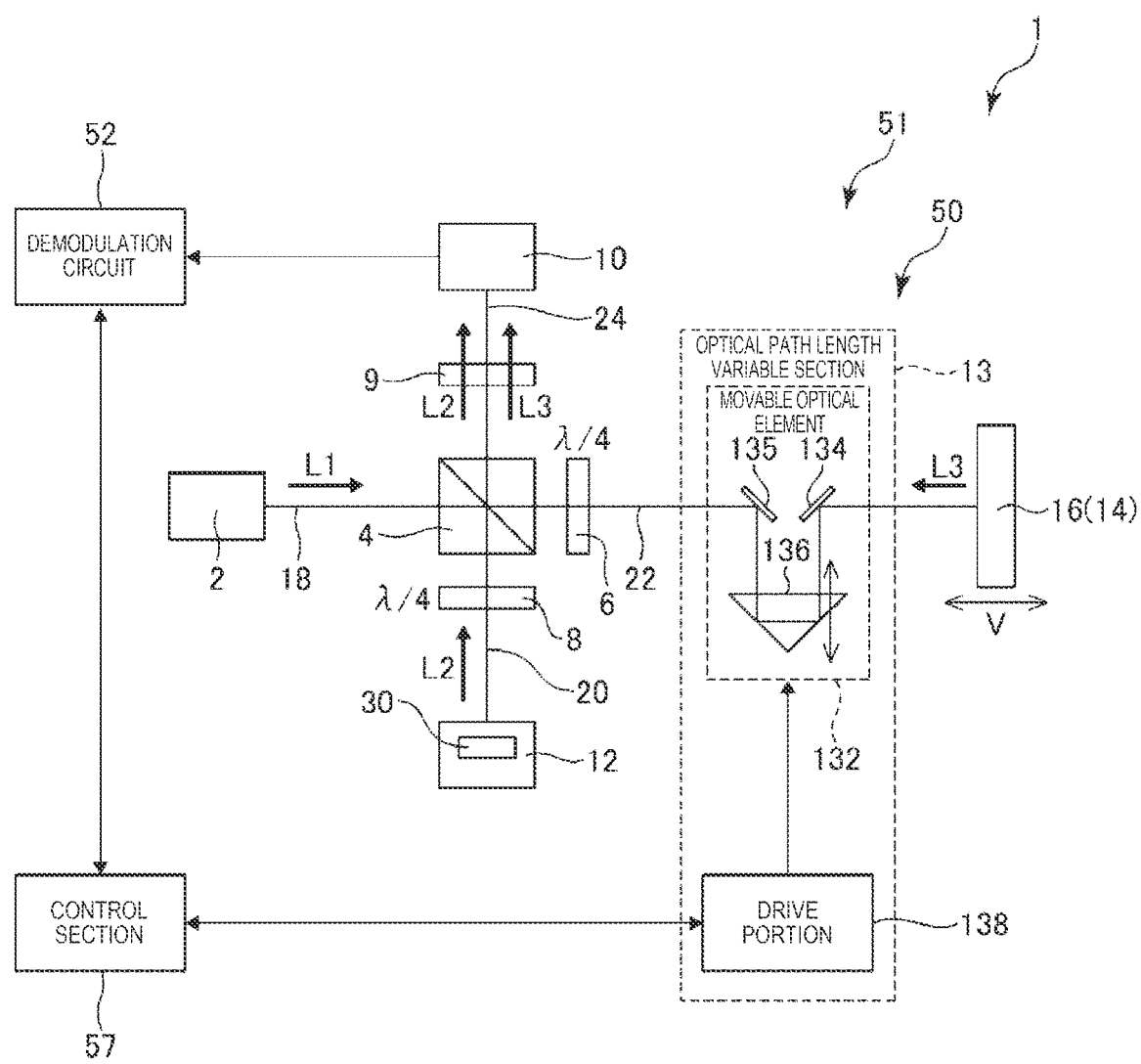
FIG. 2 is a schematic configuration diagram showing a sensor head section and an optical system shown in FIG. 1.

FIG. 2 is a schematic configuration diagram showing the sensor head section 51 and the optical system 50 shown in FIG. 1.

The optical system 50 includes a light source 2, a polarization beam splitter 4, a quarter wave plate 6, a quarter wave plate 8, an optical analyzer 9, a photodetector 10, a frequency shifter type optical modulator 12, an optical path length variable section 13, and a set section 16 in which an object 14 to be measured is arranged.

The light source 2 emits emission light L1 (first laser light) having a predetermined wavelength. The photodetector 10 converts the received light into an electric signal. The optical modulator 12 includes a vibrator 30 and modulates the emission light L1 to generate reference light L2 (second laser light) including a modulated signal. The set section 16 may be provided as needed, and the object 14 to be measured can be arranged therein. The emission light L1 incident on the object 14 to be measured is reflected as object light L3 (third laser light) including a sample signal derived from the object 14 to be measured.

The optical path of the emission light L1 emitted from the light source 2 is referred to as an optical path 18. The optical path 18 is coupled to the optical path 20 by the reflection of the polarization beam splitter 4. On the optical path 20, the quarter wave plate 8 and the optical modulator 12 are arranged in this order from the polarization beam splitter 4 side. Further, the optical path 18 is coupled to an optical path 22 by the transmission of the polarization beam splitter 4. On the optical path 22, the quarter wave plate 6, the optical path length variable section 13, and the set section 16 are arranged in this order from the polarization beam splitter 4 side.

The optical path 20 is coupled to an optical path 24 by the transmission of the polarization beam splitter 4. On the optical path 24, the optical analyzer 9 and the photodetector 10 are arranged in this order from the polarization beam splitter 4 side.

The emission light L1 emitted from the light source 2 enters the optical modulator 12 via the optical path 18 and the optical path 20. Further, the emission light L1 enters the object 14 to be measured via the optical path 18 and the optical path 22. The reference light L2 generated by the optical modulator 12 enters the photodetector 10 via the optical path 20 and the optical path 24. The object light L3 generated by the reflection from the object 14 to be measured enters the photodetector 10 via the optical path 22 and the optical path 24.

Hereinafter, each section of the laser interferometer 1 will be described in sequence.

1.1. Light Source

The light source 2 is a laser light source that emits an emission light L1 with a narrow line width having coherence. When the line width is displayed by frequency difference, a laser light source having a line width of MHz band or less is preferably used. Specifically, gas lasers such as HeNe lasers, and semiconductor laser elements such as a distributed feedback-laser diode (DFB-LD), a laser diode with fiber bragg grating (FBG-LD), or a vertical cavity surface emitting laser (VCSEL) can be exemplified.

The light source 2 preferably includes a semiconductor laser element. This makes it possible to make the light source 2 particularly miniaturized. Therefore, the laser interferometer 1 can be made smaller. In particular, the sensor head section 51 in the laser interferometer 1, in which the optical system 50 is accommodated, can be made smaller and lighter, and thus it is also useful in that the operability of the laser interferometer 1 can be improved.

1.2. Polarization Beam Splitter

The polarization beam splitter 4 is an optical element that splits the incident light into transmitted light and reflected light. Further, the polarization beam splitter 4 has a function of transmitting P-polarized light and reflecting S-polarized light, and can divide the polarization state of the incident light into orthogonal components. Hereinafter, a case where the emission light L1 which is linearly polarized light and has a ratio between the P-polarized light and the S-polarized light of, for example, 50:50 is incident on the polarization beam splitter 4 will be considered.

As described above, the polarization beam splitter 4 reflects the S-polarized light of the emission light L1 and transmits the P-polarized light.

The S-polarized light of the emission light L1 reflected by the polarization beam splitter 4 is converted into circularly polarized light at the quarter wave plate 8 and incident on the optical modulator 12. The circularly polarized light of the emission light L1 incident on the optical modulator 12 undergoes a frequency shift of $f_m$ [Hz] and is reflected as the reference light L2. Therefore, the reference light L2 includes a modulated signal having a modulation frequency of $f_m$ [Hz]. The reference light L2 is converted into the P-polarized light when the reference light L2 passes through the quarter wave plate 8 again. The P-polarized light of the reference light L2 passes through the polarization beam splitter 4 and the optical analyzer 9 and is incident on the photodetector 10.

The P-polarized light of the emission light L1 passing through the polarization beam splitter 4 is converted into circularly polarized light at the quarter wave plate 6 and incident on the object 14 to be measured in a moving state. The circularly polarized light of the emission light L1 incident on the object 14 to be measured undergoes a Doppler shift of $f_d$ [Hz] and is reflected as the object light L3. Therefore, the object light L3 includes a frequency signal having a frequency of $f_d$ [Hz]. The object light L3 is converted into the S-polarized light when the object light L3 passes through the quarter wave plate 6 again via the optical path length variable section 13. The S-polarized light of the object light L3 is reflected by the polarization beam splitter 4, passes through the optical analyzer 9, and is incident on the photodetector 10.

As described above, since the emission light L1 has coherence, the reference light L2 and the object light L3 are incident on the photodetector 10 as interference light.

A non-polarization beam splitter may be used instead of the polarization beam splitter. In this case, since the quarter wave plate 6 and the quarter wave plate 8 are not required, the laser interferometer 1 can be made smaller by reducing the number of parts.

1.3. Optical Analyzer

Since the S-polarized light and the P-polarized light that are orthogonal to each other are independent of each other, interference does not appear by simply superimposing them. Therefore, a light wave obtained by superimposing the S-polarized light onto the P-polarized light is passed through the optical analyzer 9 tilted by 45° with respect to both S-polarized light and P-polarized light. By using the optical analyzer 9, light of the components common to each other can be transmitted to cause interference. As a result, in the optical analyzer 9, the modulated signal and the sample signal interfere with each other, and interference light having a frequency of $f_m - f_d$ [Hz] is generated.

1.4. Photodetector

The reference light L2 and the object light L3 are incident on the photodetector 10 via the polarization beam splitter 4 and the optical analyzer 9. Thereby, the reference light L2 and the object light L3 interfere with each other by optical heterodyne, and the interference light having a frequency of $f_m - f_d$ [Hz] is incident on the photodetector 10. By demodulating the sample signal from the interference light by the method to be described later, the movement of the object 14 to be measured, that is, the velocity and the vibration can be finally obtained. Examples of the photodetector 10 include a photodiode and the like.

1.5. Optical Modulator

Figure 3:
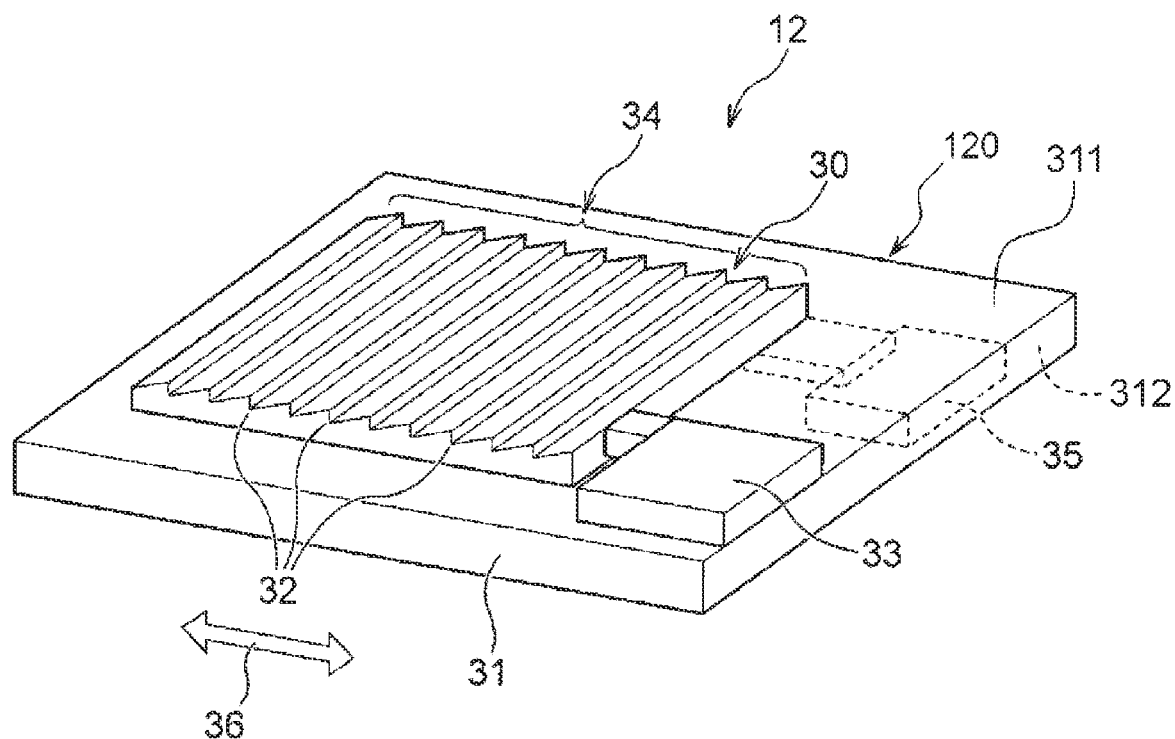
FIG. 3 is a perspective view showing a first configuration example of an optical modulator shown in FIG. 2.

FIG. 3 is a perspective view showing a first configuration example of the optical modulator 12 shown in FIG. 2.

1.5.1. Outline of Optical Modulator According to First Configuration Example The frequency shifter type optical modulator 12 has an optical modulation resonator 120. The optical modulation resonator 120 shown in FIG. 3 includes a plate-shaped vibrator 30 and a substrate 31 that supports the vibrator 30.

The vibrator 30 is made of a material that repeats a mode of vibrating so as to be distorted in a direction along a surface by applying an electric potential. In the present embodiment, the vibrator 30 is a quartz crystal AT resonator that vibrates by thickness sliding along a vibration direction 36 in the high frequency region of the MHz band. A diffraction grating 34 is formed on the surface of the vibrator 30. The diffraction grating 34 has a structure in which a plurality of linear grooves 32 are arranged at regular intervals.

The substrate 31 has a front surface 311 and a back surface 312 having a front and back relationship with each other. The vibrator 30 is arranged on the front surface 311. Further, the front surface 311 is provided with a pad 33 for applying an electric potential to the vibrator 30. On the other hand, the back surface 312 is also provided with a pad 35 for applying an electric potential to the vibrator 30.

The size of the substrate 31 is, for example, about 0.5 mm or more and 10.0 mm or less on the long side. The thickness of the substrate 31 is, for example, about 0.10 mm or more and 2.0 mm or less. As an example, the substrate 31 has a shape of a square with a side of 1.6 mm and has a thickness of 0.35 mm.

The size of the vibrator 30 is, for example, about 0.2 mm or more and 3.0 mm or less on the long side. The thickness of the vibrator 30 is, for example, about 0.003 mm or more and 0.5 mm or less.

As an example, the vibrator 30 has a shape of a square with a side of 1.0 mm and has a thickness of 0.07 mm. In this case, the vibrator 30 oscillates at a basic oscillation frequency of 24 MHz. The oscillation frequency can be adjusted in the range of 1 MHz to 1 GHz by changing the thickness of the vibrator 30 and even considering overtones.

In FIG. 3, the diffraction grating 34 is formed on the entire surface of the vibrator 30, but it may be formed only on a part of the surface.

The intensity of the optical modulation by the optical modulator 12 is given by a dot product of a difference wave vector between a wave vector of the emission light L1 incident on the optical modulator 12 and a wave vector of the emission light L2 emitted from the optical modulator 12 and a vector of the vibrator 30 in the vibration direction 36. In the present embodiment, since the vibrator 30 vibrates by thickness sliding and this vibration is in-plane vibration, optical modulation cannot be performed even if light is incident perpendicularly to the surface of the vibrator 30 alone. Therefore, in the present embodiment, by providing the diffraction grating 34 in the vibrator 30, optical modulation can be performed by a principle to be described later.

The diffraction grating 34 shown in FIG. 3 is a blazed diffraction grating. The blazed diffraction grating is one in which the cross-sectional shape of the diffraction grating is stepped. The linear groove 32 of the diffraction grating 34 is provided such that its extending direction is orthogonal to the vibration direction 36.

When a drive signal S1 is supplied from the oscillation circuit 54 shown in FIG. 1 to the vibrator 30 shown in FIG. 3 (an AC voltage is applied), the vibrator 30 oscillates. The electric power (driving power) required for the oscillation of the vibrator 30 is not particularly limited, but is as small as about 0.1 µW to 100 mW. Therefore, the drive signal S1 output from the oscillation circuit 54 can be used to oscillate the vibrator 30 without amplification.

Further, since the optical modulator in the related art needs a structure for maintaining the temperature of the optical modulator, it is difficult to reduce the volume. Further, since the power consumption of the optical modulator is large, there is a problem that it is difficult to reduce the size and power consumption of the laser interferometer. On the other hand, in the present embodiment, since the volume of the vibrator 30 is very small and the electric power required for oscillation is also small, it is easy to reduce the size and power consumption of the laser interferometer 1.

1.5.2. Method of Forming Diffraction Grating

The method of forming the diffraction grating 34 is not particularly limited, but as an example, a method may be provided in which the mold is formed by a method using a mechanical engraving type (ruling engine) and the groove 32 is formed on an electrode formed on the surface of the vibrator 30 of the quartz crystal AT resonator by the nanoimprint method. Here, the reason why it is formed on the electrode is that in the case of the quartz crystal AT resonator, in principle, high-quality thickness sliding vibration can be generated on the electrode. The groove 32 is not limited to being formed on the electrode, but may be formed on the surface of the material of the non-electrode portion. Further, instead of the nanoimprint method, a processing method by exposure and etching, an electron beam drawing lithography method, a focused ion beam processing method (FIB), or the like may be used.

Further, a diffraction grating of a resist material may be formed on the chip of the quartz crystal AT resonator, and a metal film or a mirror film made of a dielectric multilayer film may be provided therein. By providing the metal film or the mirror film, the reflectance of the diffraction grating 34 can be increased.

Further, the metal film or the mirror film may be formed on a processed surface after forming the resist film is on the chip or the wafer of the quartz crystal AT resonator, performing etching processing, and then removing the resist film. In this case, since the resist material is removed, the influence of moisture absorption of the resist material or the like is eliminated, and the chemical stability of the diffraction grating 34 can be improved. Further, by providing a highly conductive metal film such as Au or Al, it can also be used as an electrode for driving the vibrator 30.

The diffraction grating 34 may be formed by using a technique such as anodized alumina (porous alumina).

1.5.3. Optical Modulator According to Another Configuration Example

The vibrator 30 is not limited to the quartz crystal resonator, and may be, for example, a Si resonator, a surface acoustic wave (SAW) device, or the like.

Figure 4:
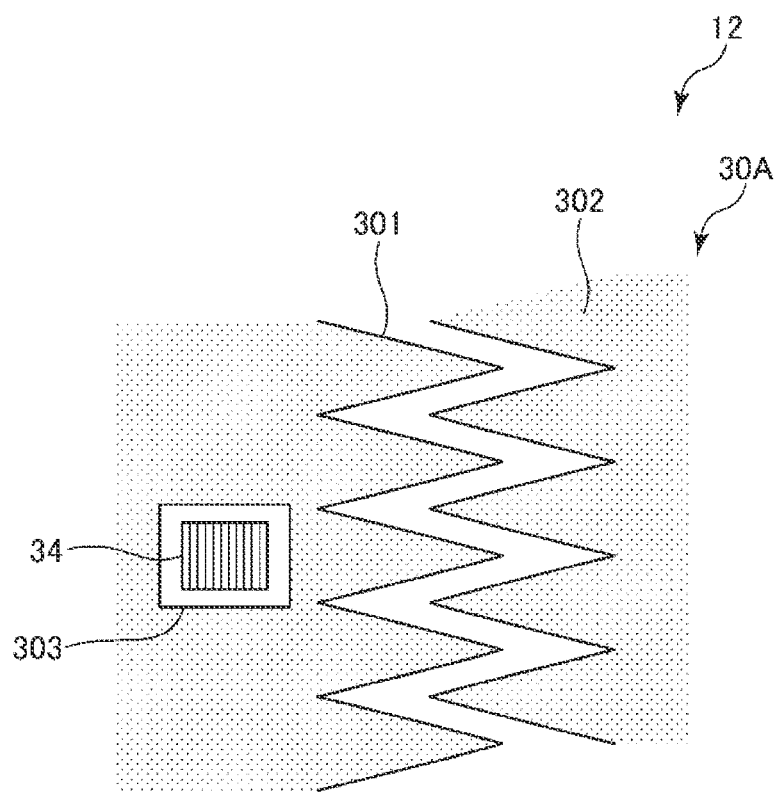
FIG. 4 is a plan view showing a part of a second configuration example of the optical modulator.
Figure 5:
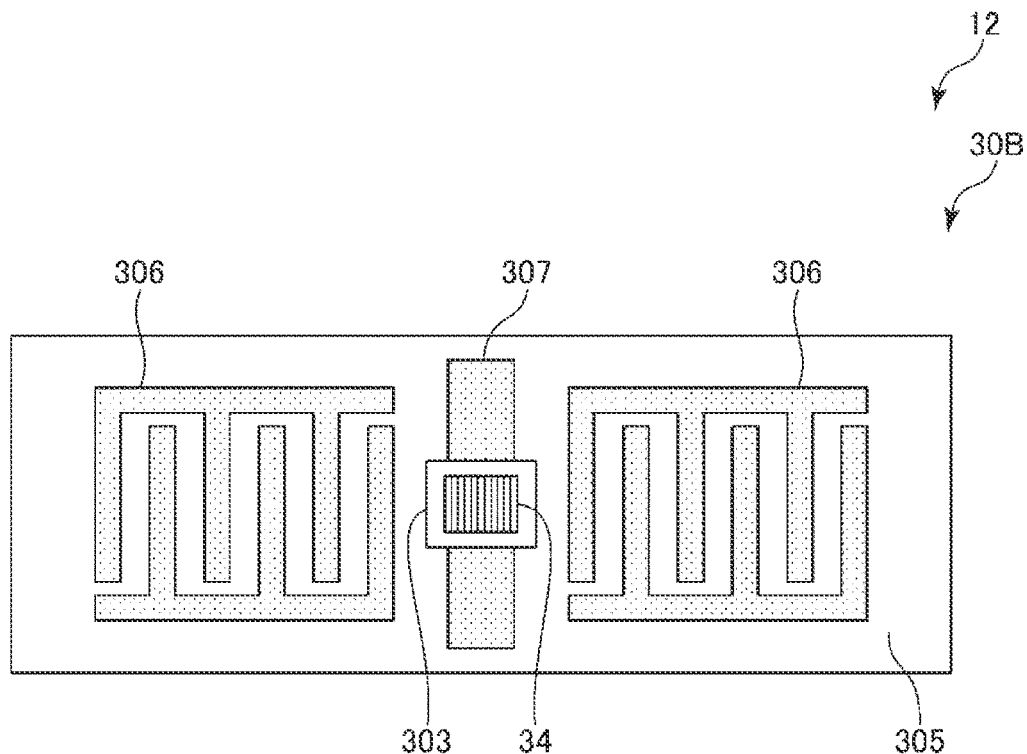
FIG. 5 is a plan view showing a third configuration example of the optical modulator.

FIG. 4 is a plan view showing a part of a second configuration example of the optical modulator 12. FIG. 5 is a plan view showing a third configuration example of the optical modulator 12.

A vibrator 30A shown in FIG. 4 is a Si resonator manufactured by using the MEMS technique. MEMS stands for Micro Electro Mechanical Systems.

The vibrator 30A includes a first electrode 301 and a second electrode 302 adjacent to each other on the same plane with a gap, a diffraction grating mounting portion 303 provided on the first electrode 301, and the diffraction grating 34 provided on the diffraction grating mounting portion 303. For example, the first electrode 301 and the second electrode 302 vibrate in the left-right direction of FIG. 4 so as to repeatedly approach and separate from each other by using an electrostatic attraction force as a driving force. Thereby, in-plane vibration can be applied to the diffraction grating 34. The oscillation frequency of the Si resonator is, for example, about 1 kHz to several hundred MHz.

A vibrator 30B shown in FIG. 5 is a SAW device that utilizes surface waves. SAW stands for a Surface Acoustic Wave.

The vibrator 30B includes a piezoelectric substrate 305, inter digital transducers 306 provided on the piezoelectric substrate 305, a ground electrode 307, the diffraction grating mounting portion 303, and the diffraction grating 34. When an AC voltage is applied to the inter digital transducer 306, the surface wave is excited by the inverse piezoelectric effect. Thereby, in-plane vibration can be applied to the diffraction grating 34. The oscillation frequency of the SAW device is, for example, several hundred MHz to several GHz.

By providing the diffraction grating 34 in the above-mentioned device as well, optical modulation can be performed by the principle to be described later, as in the case of the quartz crystal AT resonator.

On the other hand, when the vibrator 30 has the quartz crystal resonator, a highly accurate modulated signal can be generated by utilizing an extremely high Q value of the quartz crystal. The Q value is an index showing the sharpness of the peak of resonance. Further, as a feature of the quartz crystal resonator, it is not easily affected by disturbance. Therefore, by using the modulated signal modulated by the optical modulator 12 including the quartz crystal resonator, a sample signal derived from the object 14 to be measured can be acquired with high accuracy.

1.5.4. Optical Modulation by Vibrator

Next, the principle of modulating light by using the optical modulator 12 shown in FIG. 3 will be described.

Figure 6:
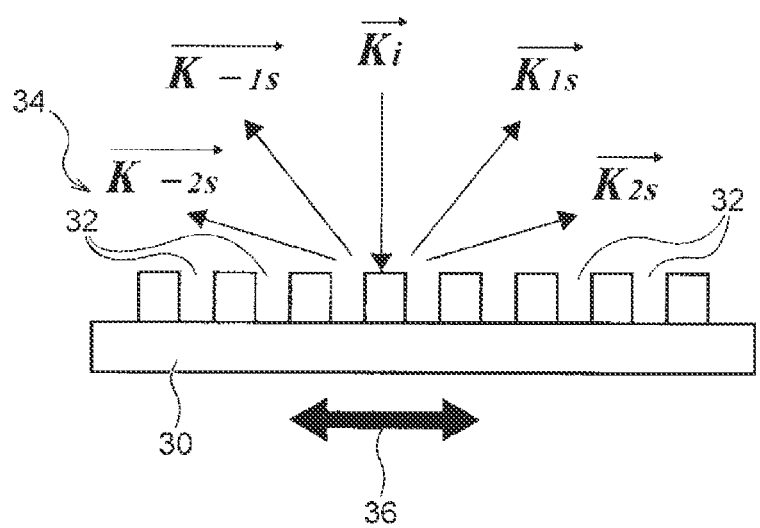
FIG. 6 is a conceptual diagram illustrating that a plurality of diffracted light beams are generated when incident light is incident in a direction perpendicular to a surface of a vibrator shown in FIG. 3.

FIG. 6 is a conceptual diagram illustrating that a plurality of diffracted light beams are generated when incident light $K_i$ is incident in a direction perpendicular to the surface of the vibrator 30 shown in FIG. 3.

When the incident light $K_i$ is incident on the diffraction grating 34 that is vibrating by thickness sliding along the vibration direction 36, a plurality of diffracted light beams $K_{ns}$ are generated as shown in FIG. 6 due to the diffraction phenomenon. n is the order of the diffracted light $K_{ns}$, and n=0, ±1, ±2, . . . . In FIG. 6, the diffraction grating 34 is not the blazed diffraction grating shown in FIG. 3, but a diffraction grating made by repeated irregularities as an example of another diffraction grating.

In FIG. 6, the incident light $K_i$ is incident in a direction perpendicular to the surface of the vibrator 30; however, the incident angle is not particularly limited and may be set so that the incident light is obliquely incident on the surface of the vibrator 30. When the light is incident at an angle, the traveling direction of the diffracted light $K_{ns}$ also changes accordingly.

Depending on the design of the diffraction grating 34, higher-order light of $|n| \geq 2$ may not appear. Therefore, in order to obtain a stable modulated signal, it is desirable to set $|n|=1$. That is, in the laser interferometer 1 of FIG. 2, the frequency shifter type optical modulator 12 is preferably arranged so that the ±1st-order diffracted light is used as the reference light L2. With this arrangement, it is possible to achieve stabilization of measurement by the laser interferometer 1.

On the other hand, when higher-order light of $|n| \geq 2$ appears from the diffraction grating 34, the optical modulator 12 may be arranged so that any diffracted light of ±2nd order or higher is used as the reference light L2 instead of the ±1st-order diffracted light. Thereby, higher-order diffracted light can be used, and thus the laser interferometer 1 can be made higher in frequency and smaller in size.

In the present embodiment, as an example, the optical modulator 12 is configured such that the angle formed by an entering direction of the incident light $K_i$ incident on the optical modulator 12 and the traveling direction of the reference light L2 emitted from the optical modulator 12 is 180°. Hereinafter, three configuration examples will be described.

Figure 7:
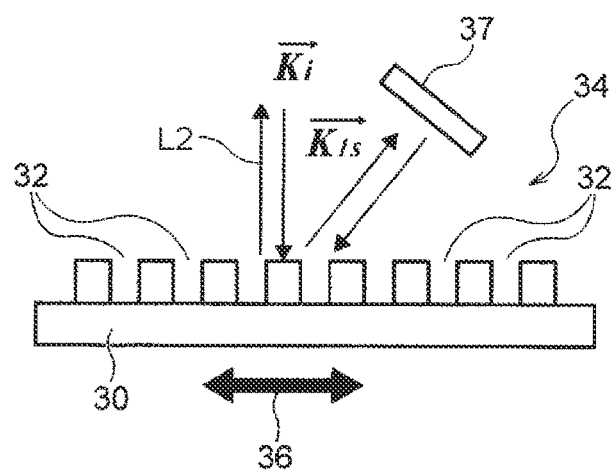
FIG. 7 is a conceptual diagram illustrating an optical modulator configured such that the angle formed by the traveling direction of the incident light and the traveling direction of the reference light is 180°.
Figure 8:
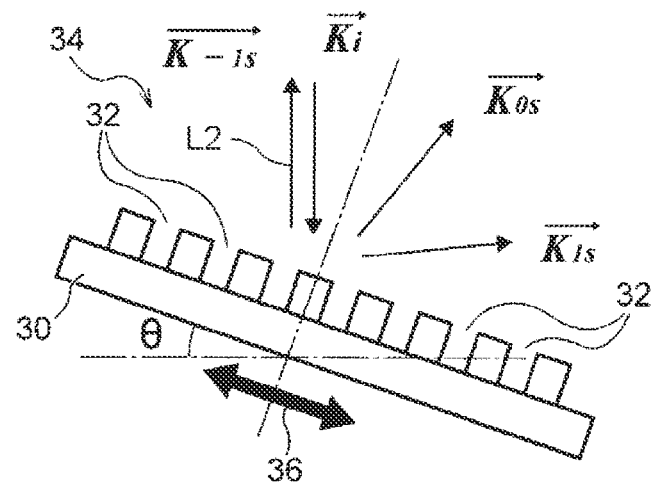
FIG. 8 is a conceptual diagram illustrating an optical modulator configured such that the angle formed by the traveling direction of the incident light and the traveling direction of the reference light is 180°.
Figure 9:
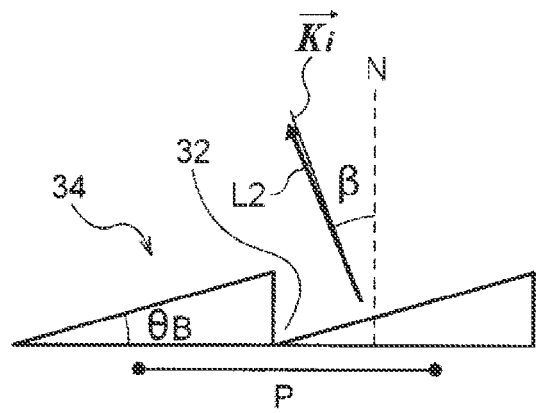
FIG. 9 is a conceptual diagram illustrating an optical modulator configured such that the angle formed by the traveling direction of the incident light and the traveling direction of the reference light is 180°.

FIGS. 7 to 9 are conceptual diagrams illustrating the optical modulator 12 configured such that an angle formed by the traveling direction of the incident light $K_i$ and the traveling direction of the reference light L2 is 180°.

In FIG. 7, the optical modulator 12 includes a mirror 37 in addition to the vibrator 30. The mirror 37 is arranged so as to reflect diffracted light $K_{1s}$ and return it to the diffraction grating 34. At this time, the angle formed by the incident angle of the diffracted light $K_{1s}$ with respect to the mirror 37 and the reflection angle of the mirror 37 is 180°. As a result, the diffracted light $K_{1s}$ emitted from the mirror 37 and returned to the diffraction grating 34 is diffracted again by the diffraction grating 34, and travels in the direction opposite to the traveling direction of the incident light $K_i$ incident on the optical modulator 12. Therefore, by adding the mirror 37, it is possible to satisfy the condition that the angle formed by the entering direction of the incident light $K_i$ and the traveling direction of the reference light L2 is 180°, as described above.

By passing through the mirror 37 in this way, the reference light L2 generated by the optical modulator 12 is subjected to frequency modulation twice. Therefore, by using the mirror 37 together, the frequency modulation of a high frequency becomes possible as compared with the case where the vibrator 30 alone is used.

In FIG. 8, the vibrator 30 is tilted with respect to the arrangement shown in FIG. 6. The inclination angle θ at this time is set so as to satisfy the condition that the angle formed by the entering direction of the incident light $K_i$ and the traveling direction of the reference light L2 is 180°.

The diffraction grating 34 shown in FIG. 9 is a blazed diffraction grating having a blaze angle $\theta_B$. Then, when the incident light $K_i$ traveling at an incident angle β is incident on the diffraction grating 34 with respect to a normal line N on the surface of the vibrator 30, the reference light L2 returns at the same angle as the blaze angle $\theta_B$ with respect to the normal line N. Therefore, by making the incident angle β equal to the blaze angle $\theta_B$, it is possible to satisfy the condition that the angle formed by the entering direction of the incident light $K_i$ and the traveling direction of the reference light L2 is 180°, as described above. In this case, since the above conditions can be satisfied without using the mirror 37 shown in FIG. 7 and without tilting the vibrator 30 itself as shown in FIG. 8, the laser interferometer 1 can be further miniaturized and have a higher frequency. In particular, in the case of a blazed diffraction grating, an arrangement satisfying the above conditions is called a "Littrow arrangement", and there is an advantage that the diffraction efficiency of the diffracted light can be particularly improved.

A pitch P in FIG. 9 represents the pitch of the blazed diffraction grating, and as an example, the pitch P is 1 μm. The blaze angle $\theta_B$ is 25°. In this case, in order to satisfy the above conditions, the incident angle β with respect to the normal line N of the incident light $K_i$ may be set to 25°.

1.5.5. Package Structure

Figure 10:
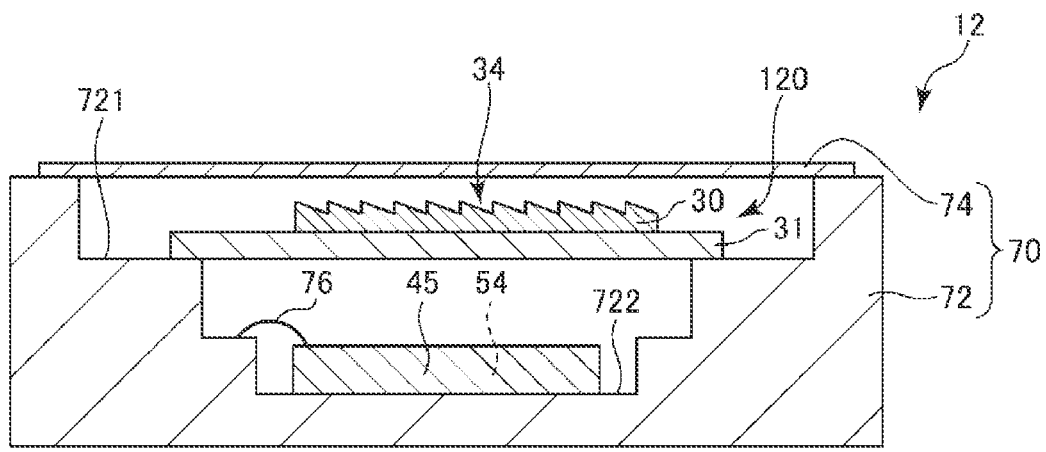
FIG. 10 is a cross-sectional view showing an optical modulator having a package structure.

FIG. 10 is a cross-sectional view showing the optical modulator 12 having a package structure.

The optical modulator 12 shown in FIG. 10 includes a container 70 which is a housing, the optical modulation resonator 120 housed in the container 70, and a circuit element 45 constituting the oscillation circuit 54. The container 70 is hermetically sealed in a reduced pressure atmosphere such as vacuum or an inert gas atmosphere such as nitrogen or argon, for example.

As shown in FIG. 10, the container 70 has a container body 72 and a lid 74. Of these, the container body 72 has a first recess 721 provided inside the container body 72, and a second recess 722 provided inside the first recess 721 and deeper than the first recess 721. The container body 72 is made of, for example, a ceramic material, a resin material, or the like. Further, although not shown, the container body 72 includes an internal terminal provided on the inner surface, an external terminal provided on the outer surface, wiring for coupling the internal terminal and the external terminal, and the like.

Further, the opening of the container body 72 is closed with the lid 74 via a sealing member such as a seal ring or low melting point glass (not shown). As the constituent material of the lid 74, a material capable of transmitting laser light, for example, a glass material or the like is used.

The optical modulation resonator 120 is arranged on the bottom surface of the first recess 721. The optical modulation resonator 120 is supported on the bottom surface of the first recess 721 by a joining member (not shown). Further, the internal terminal of the container body 72 and the optical modulation resonator 120 are electrically coupled via a conductive material (not shown) such as a bonding wire or a bonding metal.

The circuit element 45 is arranged on the bottom surface of the second recess 722. The circuit element 45 is electrically coupled to the internal terminal of the container body 72 via a bonding wire 76. Accordingly, the optical modulation resonator 120 and the circuit element 45 are also electrically coupled via the wiring provided in the container body 72. The circuit element 45 may be provided with a circuit other than the oscillation circuit 54 described later.

As described above, the optical modulator 12 according to the present embodiment includes the container 70 which is a housing that houses the vibrator 30. The oscillation circuit 54 is also housed in the container 70.

By adopting such a package structure, the optical modulation resonator 120 and the circuit element 45 can be overlapped with each other, so that the physical distance between the two can be reduced, and the wiring length between the optical modulation resonator 120 and the circuit element 45 can be shortened. Therefore, it is possible to suppress external noise from entering the drive signal S1 and conversely, the drive signal S1 from becoming a noise source. Further, in one container 70, both the optical modulation resonator 120 and the circuit element 45 can be protected from the external environment. Therefore, the reliability of the laser interferometer 1 can be improved while reducing the size of the sensor head section 51.

The structure of the container 70 is not limited to the structure shown in the drawing, and for example, the optical modulation resonator 120 and the circuit element 45 may have separate package structures. Further, although not shown, other circuit elements constituting the oscillation circuit 54 may be housed in the container 70. The container 70 may be provided as needed and may be omitted.

1.6. Optical Path Length Variable Section

The optical path length variable section 13 shown in FIG. 2 is arranged on the optical path 22 and changes the optical path length of the optical path 22 through which the object light L3 propagates. The optical path length variable section 13 shown in FIG. 2 includes a movable optical element 132 and a drive portion 138 that drives the movable optical element 132.

The movable optical element 132 shown in FIG. 2 includes a mirrors 134 and 135 that change the direction of the optical path 22 and a prism 136 that is driven by the drive portion 138. The drive portion 138 reciprocates the prism 136 so as to move away from or approach the mirrors 134 and 135. The mirror 134 changes the direction of the optical path 22 so that the object light L3 emitted from the object 14 to be measured is reflected toward the prism 136. The prism 136 changes the direction of the optical path 22 so that the object light L3 is reflected toward the mirror 135. The mirror 135 changes the direction of the optical path 22 so that the object light L3 is reflected toward the quarter wave plate 6.

When the prism 136 is moved, the distance between the mirrors 134 and 135 and the prism 136 increases or decreases. Accordingly, the optical path length of the optical path 22, that is, the optical distance of the optical path 22 also increases or decreases. The optical path length in the present specification refers to an optical distance.

The mirrors 134, 135 and prism 136 can be replaced by various optical components that can change the direction of the optical path 22, respectively.

Examples of the drive portion 138 include a MEMS actuator, a piezo actuator, an electromagnetic drive actuator, and the like. MEMS refers to Micro Electro Mechanical Systems.

Further, a movable optical system used in a Fourier Transform Infrared Spectrometer (FTIR) engine can also be used for the optical path length variable section 13.

2. Control Section

The control section 57 controls the operation of the optical path length variable section 13 and the operation of the demodulation circuit 52.

Specifically, the control section 57 controls the operation of the optical path length variable section 13 according to the operation status of the demodulation circuit 52. The demodulation circuit 52 operates in two operation modes, a maximum amplitude recording mode and a measurement mode, which will be described later. The control section 57 switches the operation of the optical path length variable section 13 according to the operation modes.

Although not shown, the hardware configuration of the control section 57 includes, for example, a processor, a memory, an external interface, and the like coupled to each other by an internal bus. When the processor reads and executes the program stored in the memory, various operations of the control section 57 such as switching operation between the maximum amplitude recording mode and the measurement mode are realized.

3. Oscillation Circuit

As shown in FIG. 1, the oscillation circuit 54 outputs the drive signal S1 input to the optical modulator 12 of the optical system 50. Further, the oscillation circuit 54 outputs the reference signal S2 input to the demodulation circuit 52.

Figure 11:
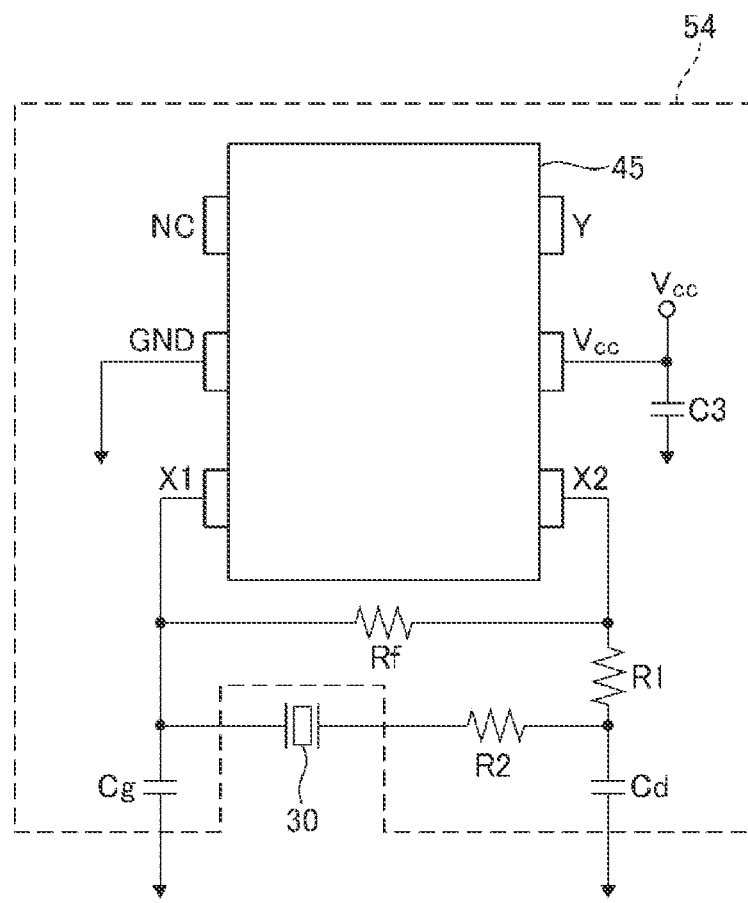
FIG. 11 is a circuit diagram showing a configuration of a one-stage inverter oscillation circuit.

The oscillation circuit 54 is not particularly limited as long as it is a circuit capable of oscillating the vibrator 30, and circuits having various configurations are used. FIG. 11 is a circuit diagram showing a configuration of a one-stage inverter oscillation circuit as an example of a circuit configuration.

The oscillation circuit 54 shown in FIG. 11 includes the circuit element 45, a feedback resistor Rf, a first limiting resistor R1, a second limiting resistor R2, a first capacitor Cg, a second capacitor Cd, and a third capacitor C3.

The circuit element 45 is an inverter IC. Terminals X1 and X2 of the circuit element 45 are terminals coupled to the inverter, respectively. A terminal GND is coupled to the ground potential and a terminal Vcc is coupled to the power potential. A terminal Y is a terminal for oscillation output.

The first capacitor Cg is coupled between the terminal X1 and the ground potential. Further, between the terminal X2 and the ground potential, the first limiting resistor R1 and the second capacitor Cd coupled in series with each other are coupled in this order from the terminal X2 side. Further, one end of the feedback resistor Rf is coupled between the terminal X1 and the first capacitor Cg, and the other end of the feedback resistor Rf is coupled between the terminal X2 and the first limiting resistor R1.

Further, one end of the second limiting resistor R2 is coupled between the first limiting resistor R1 and the second capacitor Cd. Further, the above-mentioned vibrator 30 is coupled between the first capacitor Cg and the feedback resistor Rf and the other end of the second limiting resistor R2. That is, the vibrator 30 serves as a signal source of the oscillation circuit 54.

Figure 12:
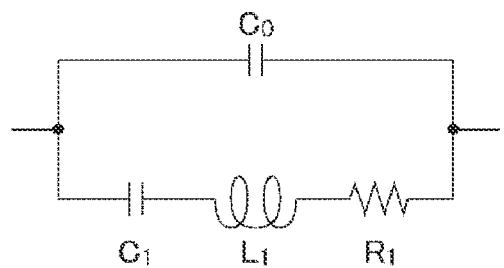
FIG. 12 is an example of an LCR equivalent circuit of a vibrator.

Further, FIG. 12 is an example of an LCR equivalent circuit of the vibrator 30.

As shown in FIG. 12, the LCR equivalent circuit of the vibrator 30 is composed of a series capacitance $C_1$, a series inductance $L_1$, an equivalent series resistance $R_1$, and a parallel capacitance $C_0$.

In the oscillation circuit 54 shown in FIG. 11, when the capacitance of the first capacitor Cg is Cg and the capacitance of the second capacitor Cd is Cd, a load capacitance CL is given by the following equation (a).

$$C_L = \frac{C_d C_g}{C_d + C_g} \tag{a}$$

Then, an oscillation frequency $f_{osc}$ output from the terminal Y of the oscillation circuit 54 is given by the following equation (b).

$$f_{osc} = f_Q \sqrt{1 + \frac{C_1}{C_0 + C_L}} \tag{b}$$

$f_Q$ is the natural frequency of the vibrator 30.

According to the above equation (b), it can be seen that the oscillation frequency $f_{osc}$ of the signal output from the terminal Y can be finely adjusted by appropriately changing the load capacitance CL.

Further, a difference $\Delta f$ between the natural frequency $f_Q$ of the vibrator 30 and the oscillation frequency $f_{osc}$ of the oscillation circuit 54 is given by the following equation (c).

$$\Delta f = f_{osc} - f_Q = f_Q \left( \sqrt{1 + \frac{C_1}{C_0 + C_L}} - 1 \right) \tag{c}$$

Here, since $C_1 \ll C_0$ and $C_1 \ll C_L$, $\Delta f$ is approximately given by the following equation (d).

$$\Delta f = f_{osc} - f_Q \cong \frac{C_1}{2(C_0 + C_L)} f_Q \tag{d}$$

Therefore, the oscillation frequency $f_{osc}$ of the oscillation circuit 54 becomes a value corresponding to the natural frequency $f_Q$ of the vibrator 30.

When the vibrator 30 is fixed to, for example, the container 70, the natural frequency $f_Q$ fluctuates when it receives expansion stress due to temperature through the fixed portion. Further, when the vibrator 30 is tilted, the natural frequency $f_Q$ fluctuates due to the influence of the gravity effect of its own weight.

In the oscillation circuit 54, even if the natural frequency $f_Q$ fluctuates for this reason, the oscillation frequency $f_{osc}$ changes in conjunction with the fluctuation based on the above equation (d). That is, the oscillation frequency $f_{osc}$ is always a value deviated from the natural frequency $f_Q$ by $\Delta f$. Accordingly, the vibrator 30 can stably obtain a displacement amplitude $L_0$. If the displacement amplitude $L_0$ can be stabilized, the modulation characteristics of the optical modulator 12 can be stabilized, and the demodulation accuracy of the sample signal in the demodulation circuit 52 can be improved.

As an example, $\Delta f = f_{osc} - f_Q \leq 600$ [Hz] is preferable, and $240$ [Hz] $\leq \Delta f \leq 450$ [Hz] is more preferable.

Instead of the oscillation circuit 54, a signal generator such as a function generator or a signal generator may be used.

4. Demodulation Circuit

The demodulation circuit 52 performs a demodulation process for demodulating a sample signal derived from the object 14 to be measured from the light reception signal output from the photodetector 10. The sample signal is, for example, a phase signal or a frequency signal. Displacement information of the object 14 to be measured can be acquired from the phase signal. Further, velocity information of the object 14 to be measured can be acquired from the frequency signal. If different information can be acquired in this way, the function as a displacement meter or a velocimeter can be provided, so that the laser interferometer 1 can be enhanced in functionality.

The circuit configuration of the demodulation circuit 52 is set according to the modulation processing method. In the laser interferometer 1 according to the present embodiment, the optical modulator 12 including the vibrator 30 is used. Since the vibrator 30 is a simple vibrator, the vibration velocity changes from moment to moment. Therefore, the modulation frequency also changes, and the demodulation circuit in the related art cannot be used as it is.

The demodulation circuit in the related art refers to a circuit that demodulates a sample signal from a light reception signal including a modulated signal modulated by using an acousto-optic modulator (AOM). In the acousto-optic modulator, the modulation frequency does not change. Therefore, the demodulation circuit in the related art can demodulate the sample signal from the light reception signal including a modulated signal modulated by the optical modulator whose modulation frequency does not change. However, when a modulated signal modulated by the optical modulator 12 whose modulation frequency changes is included, the modulated signal cannot be demodulated as it is.

Therefore, the demodulation circuit 52 shown in FIG. 1 includes a preprocessing section 53 and a demodulation section 55. The light reception signal output from the photodetector 10 is first passed through the preprocessing section 53 and then guided to the demodulation section 55. The preprocessing section 53 preprocesses the light reception signal. By this preprocessing, a signal that can be demodulated by the demodulation circuit in the related art can be obtained. Therefore, in the demodulation section 55, the sample signal derived from the object 14 to be measured is demodulated by a known demodulation method.

4.1. Configuration of Preprocessing Section

The preprocessing section 53 shown in FIG. 1 includes a first bandpass filter 534, a second bandpass filter 535, a first delay adjuster 536, a second delay adjuster 537, a multiplier 538, a third bandpass filter 539, a first recording section 540, a second recording section 541, a first AGC 542, a second AGC 543, a third AGC 544, a fourth AGC 545, and a summer 546. AGC stands for an Auto Gain Control.

Further, a current-voltage converter 531 and an ADC 532 are coupled in this order from the photodetector 10 side between the preprocessing section 53 and the photodetector 10.

Further, an ADC 533 is coupled between the oscillation circuit 54 and the second delay adjuster 537.

The current-voltage converter 531 is a transimpedance amplifier, which converts a current output from the photodetector 10 into a voltage signal. The ADCs 532 and 533 are analog-to-digital converters, which convert an analog signal into a digital signal with a predetermined number of sampling bits.

The first bandpass filter 534, the second bandpass filter 535, and the third bandpass filter 539 are filters that selectively transmit signals in a specific frequency band.

The first delay adjuster 536 and the second delay adjuster 537 are circuits that adjust the signal delay. The multiplier 538 is a circuit that generates an output signal proportional to the product of two input signals.

The first recording section 540 is a detection/recording circuit that detects the maximum amplitude of the signal output from the first delay adjuster 536 and records it as a first recording maximum amplitude. The second recording section 541 is a detection/recording circuit that detects the maximum amplitude of the signal output from the third bandpass filter 539 and records it as a second recording maximum amplitude.

The first AGC 542 adjusts the amplitude of the signal passing through the first recording section 540 based on the first recording maximum amplitude recorded in the first recording section 540. The second AGC 543 adjusts the amplitude of the signal passing through the second recording section 541 based on the second recording maximum amplitude recorded in the second recording section 541.

The third AGC 544 and the fourth AGC 545 are circuits that align the amplitudes of signals with each other. The summer 546 is a circuit that generates an output signal proportional to the sum of two input signals.

The current output output from the photodetector 10 is converted into a voltage signal by the current-voltage converter 531. The voltage signal is converted into a digital signal by the ADC 532 and divided into a first signal and a second signal. In FIG. 1, the path of the first signal is referred to as a first signal path psi, and the path of the second signal is referred to as a second signal path ps2.

After the first signal is passed through the first bandpass filter 534 arranged on the first signal path psi, a group delay is adjusted by the first delay adjuster 536. The group delay adjusted by the first delay adjuster 536 corresponds to a group delay of the second signal by the second bandpass filter 535, which will be described later. Due to this delay adjustment, the delay time associated with the passage of the filter circuit can be made uniform between the first bandpass filter 534 through which the first signal passes and the second bandpass filter 535 and the third bandpass filter 539 through which the second signal passes. The first signal that has passed through the first delay adjuster 536 is input to the first recording section 540. The first recording section 540 detects the maximum amplitude of the first signal in the maximum amplitude recording mode described later, and records it as the first recording maximum amplitude. Then, in the measurement mode described later, the first recording section 540 calculates a correction coefficient $M_1$ based on the first recording maximum amplitude recorded in the maximum amplitude recording mode and the maximum amplitude of the first signal newly detected in the measurement mode. The first AGC 542 adjusts the amplitude of the first signal passing through the first recording section 540 based on the correction coefficient $M_1$ calculated by the first recording section 540. After that, the first signal is input to the summer 546 via the third AGC 544.

The second signal is passed through the second bandpass filter 535 arranged on the second signal path ps2 and then input to the multiplier 538. In the multiplier 538, a reference signal $\cos(\omega_m t)$ output from the second delay adjuster 537 is multiplied by the second signal. Specifically, the reference signal S2 output from the oscillation circuit 54 is digitally converted by the ADC 533, the phase is adjusted by the second delay adjuster 537, and the converted signal is output to the multiplier 538. After that, the second signal is passed through the third bandpass filter 539 and then input to the second recording section 541. The second recording section 541 detects the maximum amplitude of the second signal in the maximum amplitude recording mode described later, and records it as the second recording maximum amplitude. Then, in the measurement mode described later, the second recording section 541 calculates a correction coefficient $M_2$ based on the second recording maximum amplitude recorded in the maximum amplitude recording mode and the maximum amplitude of the second signal newly detected in the measurement mode. The second AGC 543 adjusts the amplitude of the second signal passing through the second recording section 541 based on the correction coefficient $M_2$ calculated by the second recording section 541. After that, the second signal is input to the summer 546 via the fourth AGC 545.

In the summer 546, an output signal proportional to the sum of the first signal and the second signal is output to the demodulation section 55.

4.2. Basic Principle of Preprocessing by Preprocessing Section

Next, the basic principle of preprocessing in the preprocessing section 53 will be described. The basic principle mentioned here refers to the principle of preprocessing in which the first recording section 540, the second recording section 541, the first AGC 542, and the second AGC 543 do not contribute, which is the principle described in JP-A-2-38889. Here, when $E_m$, $E_d$, and $\varphi$ are defined as $$E_m = a_m\{\cos(\omega_0 t + B\sin\omega_m t + \phi_m) + i\sin(\omega_0 t + B\sin\omega_m t + \phi_m)\} \quad (1)$$

$$E_d = a_d\{\cos(\omega_0 t + A\sin\omega_d t + \phi_d) + i\sin(\omega_0 t + A\sin\omega_d t + \phi_d)\} \quad (2)$$

$$\phi = \phi_m - \phi_d \quad (3)$$

a light reception signal intensity $I_{PD}$ output from the photodetector 10 is theoretically represented by the following equation.

$$I_{PD} = \langle |E_m + E_d|^2 \rangle = \langle E_m^2 + E_d^2 + 2E_m E_d \rangle = a_m^2 + a_d^2 + 2a_m a_d(B\sin\omega_m t - A\sin\omega_d t + \phi) \quad (4)$$

$E_m$, $E_d$, $\varphi_m$, $\varphi_d$, $\varphi$, $\omega_m$, $\omega_d$, $\omega_0$, $a_m$, and $a_d$ are as follows.

$E_m$: Electric field component of modulated signal
$E_d$: Electric field component of sample signal derived from object to be measured
$\varphi_m$: Initial phase value of optical path 20
$\varphi_d$: Initial phase value of optical path 22
$\varphi$: Optimal path phase difference of laser interferometer
$\omega_m$: Angular frequency of modulated signal derived from optical modulator
$\omega_d$: Angular frequency of sample signal derived from object to be measured
$\omega_0$: Angular frequency of emission light emitted from light source section
$a_m$: Coefficient
$a_d$: Coefficient Further, < > in the equation (4) represents a time average.

The first and second terms of the above equation (4) represents a DC component, and the third term represents an AC component. When this AC component is referred to as $I_{PD.AC}$, $I_{PD.AC}$ is as follows.

$$I_{PD.AC} = 2a_m a_d(B\sin\omega_m t - A\sin\omega_d t + \phi) = 2a_m a_d[\cos(B\sin\omega_m t)\cos(A\sin\omega_d t - \phi) + \sin(B\omega_m t)\sin(A\sin\omega_d t - \phi)] \quad (5)$$

$$A = \frac{f_{\Delta max}}{f_n} \quad (6)$$

$$B = \frac{f_{mmax}}{f_m} \quad (7)$$

$f_{dmax}$: Amplitude of sample signal
$f_d$: Frequency of sample signal
$f_{mmax}$: Amplitude of modulated signal
$f_m$: Frequency of modulated signal Here, a v-order Bessel function as shown in the following equation is known.

$$\cos[\zeta\sin(2\pi f_s t)] = J_0(\zeta) + 2J_2(\zeta)\cos(2\cdot 2\pi f_s t) + 2J_4(\zeta)\cos(4\cdot 2\pi f_s t) + \quad (8)$$

$$\sin[\zeta\sin(2\pi f_s t)] = 2J_1(\zeta)\sin(1\cdot 2\pi f_s t) + 2J_3(\zeta)\sin(3\cdot 2\pi f_s t) + \quad (9)$$

When the above equation (5) is series-expanded using the Bessel functions of the above equations (8) and (9), it can be transformed as follows.

$$I_{PD.AC} = 2a_m a_d[\{J_0(B) + 2J_2(B)\cos(2\cdot\omega_m t) + 2J_4(B)\cos(4\cdot\omega_m t) + \ldots\}\cos(A\sin\omega_d t - \phi) - \{2J_1(B)\sin(1\cdot\omega_m t) + 2J_3(B)\sin(3\cdot\omega_m t) + \ldots\}\sin(A\sin\omega_d t - \phi)] \quad (10)$$

However, $J_0(B)$, $J_1(B)$, $J_2(B)$, ... are Bessel coefficients, respectively.

When expanded as described above, it can be said that theoretically, the band corresponding to a specific order can be extracted by a bandpass filter.

Therefore, the preprocessing section 53 described above preprocesses the light reception signal in the following flow based on this theory.

First, the digital signal output from the above-mentioned ADC 532 is divided into two, a first signal and a second signal. The first signal is passed through the first bandpass filter 534. The central angular frequency of the first bandpass filter 534 is set to $\omega_m$. Accordingly, the first signal after passing through the first bandpass filter 534 is represented by the following equation.

$$I_{pass1} = J_1(B)\{-\cos(\omega_m t + A\sin\omega_d t - \phi) + \cos(\omega_m t - A\sin\omega_d t + \phi)\} = -2J_1(B)\sin(\omega_m t)\sin(A\sin\omega_d t - \phi) \quad (11)$$

On the other hand, the second signal is passed through the second bandpass filter 535. The central angular frequency of the second bandpass filter 535 is set to a value different from the central angular frequency of the first bandpass filter 534. Here, as an example, the central angular frequency of the second bandpass filter 535 is set to $2\omega_m$. Accordingly, the second signal after passing through the second bandpass filter 535 is represented by the following equation.

$$I_{BPF2} = J_2(B)\cos(2\cdot\omega_m t)\cdot\cos(A\sin\omega_d t - \phi) = \frac{1}{2}J_2(B) \quad (12)$$

$$\{\cos(2\cdot\omega_m t + \cos(A\sin\omega_d t - \phi)) + \cos(2\cdot\omega_m t - \cos(A\sin\omega_d t - \phi))\}$$

The second signal after passing through the second bandpass filter 535 is multiplied by the reference signal $\cos(\omega_m t)$ by the multiplier 538. The second signal after multiplication is represented by the following equation.

$$I_{\cos(\omega_m t)} = \frac{1}{2}J_2(B) \qquad (13)$$

$$\{\cos(2\cdot\omega_m t + A\sin\omega_d t - \phi) + \cos(2\cdot\omega_m t - A\sin\omega_d t + \phi)\}\cdot\cos(\omega_m t) =$$

$$\frac{1}{2}J_2(B)\{\cos(3\cdot\omega_m t + A\sin\omega_d t - \phi) + \cos(1\cdot\omega_m t + A\sin\omega_d t - \phi) +$$

$$\cos(3\cdot\omega_m t - A\sin\omega_d t + \phi) + \cos(1\cdot\omega_m t - A\sin\omega_d t + \phi)\}$$

The second signal after passing through the multiplier 538 is passed through the third bandpass filter 539. The central angular frequency of the third bandpass filter 539 is set to the same value as the central angular frequency of the first bandpass filter 534. Here, as an example, the central angular frequency of the third bandpass filter 539 is set to $\omega_m$. Accordingly, the second signal after passing through the third bandpass filter 539 is represented by the following equation.

$$I_{pass2} = \frac{1}{2}J_2(B)\{\cos(\omega_m t + A\sin\omega_d t - \phi) + \cos(\omega_m t - A\sin(\omega_d t + \phi)\} = \qquad (14)$$

$$J_2(B)\cos(\omega_m t)\cos(A\sin\omega_d t - \phi)$$

After that, the phase and amplitude of the first signal represented by the above equation (11) are adjusted with the first delay adjuster 536 and the third AGC 544. In the third AGC 544, $1/(-2J_1(B))$ is multiplied.

Further, the amplitude of the second signal represented by the above equation (14) is adjusted by the fourth AGC 545. In the fourth AGC 545, $1/J_2(B)$ is multiplied.

Then, the first signal and the second signal are summed by the summer 546. The summing result is represented by the following equation.

$$I_{S3} = \cos(\omega_m t + A\sin\omega_d t - \phi) \qquad (15)$$

As a result of the summation, the unnecessary term disappears and the necessary term can be taken out as in the above equation (15). This result is output to the demodulation section 55.

4.3. Configuration of Demodulation Section

The demodulation section 55 performs a demodulation process for demodulating a sample signal derived from the object 14 to be measured from the signal output from the preprocessing section 53. The demodulation process is not particularly limited, and examples thereof include a known orthogonal detection method. The orthogonal detection method is a method of performing the demodulation process by performing an operation of mixing signals orthogonal to each other from the outside with respect to an input signal.

The demodulation section 55 shown in FIG. 1 is a digital circuit including a first multiplier 551, a second multiplier 552, a phase shifter 553, a first low-pass filter 555, a second low-pass filter 556, a divider 557, an inverse tangent calculator 558, and a signal output circuit 559.

4.4. Principle of Demodulation Process by Demodulation Section

In the demodulation process, first, the signal output from the preprocessing section 53 is divided into two. The first multiplier 551 multiplies one of the divided signals by a frequency signal $\cos(\omega_m t)$, which is the reference signal S2 output from the oscillation circuit 54. The second multiplier 552 multiplies the other of the divided signals by a frequency signal $-\sin(\omega_m t)$ obtained by shifting the phase of the reference signal S2 output from the oscillation circuit 54 by $-90°$ by the phase shifter 553. The frequency signal $\cos(\omega_m t)$ and the frequency signal $-\sin(\omega_m t)$ are signals that are 90° out of phase with each other.

The signal passed through the first multiplier 551 is passed through the first low-pass filter 555 and then input to the divider 557 as a signal x. The signal passed through the second multiplier 552 is also passed through the second low-pass filter 556, and then input to the divider 557 as a signal y. The divider 557 divides the signal y by the signal x, passes the signal y/x through the inverse tangent calculator 558, and obtains a signal a tan(y/x).

After that, by passing the signal a tan(y/x) through the signal output circuit 559, a phase $\varphi_d$ is obtained as the sample signal derived from the object 14 to be measured. Then, the displacement information of the object 14 to be measured can be calculated based on the phase $\varphi_d$. Thereby, a displacement meter that measures the displacement of the object 14 to be measured is realized. In addition, velocity information can be obtained from the displacement information. Thereby, a velocimeter that measures the velocity of the object 14 to be measured is realized.

Although the circuit configuration of the demodulation section 55 has been described above, the circuit configuration of the above digital circuit is an example and is not limited thereto. Further, the demodulation section 55 is not limited to a digital circuit, and may be an analog circuit. The analog circuit may include an F/V converter circuit and a $\Delta\Sigma$ counter circuit.

Further, in the circuit configuration of the demodulation section 55 described above, a frequency signal may be obtained as a sample signal derived from the object 14 to be measured. The velocity information of the object 14 to be measured can be calculated based on the frequency signal.

4.5. Demodulatorable Condition

Here, in the basic principle of preprocessing in the preprocessing section 53 described above, the amplitude of the first signal and the amplitude of the second signal are aligned with each other in the third AGC 544 and the fourth AGC 545. That is, it is necessary to align the coefficient $-2J_1(B)$ included in the equation (11) and the coefficient $J_2(B)$ included in the equation (14). $J_1(B)$ and $J_2(B)$ included in these coefficients are the Bessel coefficients described above, and B among them is the ratio of the amplitude of the modulated signal to the frequency as described above. On the other hand, A included in the equations (11) and (14) is the ratio of the amplitude of the sample signal to the frequency, as described above. B is a value that is determined by the setting of the optical system 50 and takes a known constant value. For this reason, the amplitudes can be adjusted in the third AGC 544 and the fourth AGC 545.

However, such an amplitude adjustment is possible only when a portion other than the coefficient $-2J_1(B)$ in the equation (11) and a portion other than the coefficient $J_2(B)$ in the equation (14) periodically fluctuate within the range of the maximum value 1 and the minimum value $-1$, respectively. The portion other than the coefficient $-2J_1(B)$ in the equation (11) is represented by the following equation (16). The portion other than the coefficient $J_2(B)$ in the equation (14) is represented by the following equation (17).

$$I_{pass1} = \sin(\omega_m t)\sin(A\sin\omega_d t - \phi) \qquad (16)$$

$$I_{pass2} = \cos(\omega_m t)\cos(A\sin\omega_d t - \phi) \qquad (17)$$

Therefore, in order to enable the adjustment of the amplitudes in the third AGC 544 and the fourth AGC 545, it is necessary to satisfy the condition that the equations (16) and (17) periodically fluctuate within the range of the maximum value 1 and the minimum value $-1$, respectively.

Here, the angular frequency φm of the modulated signal is sufficiently larger than the angular frequency φd of the sample signal, and $\omega_m \gg \omega_d$ holds. Therefore, in order to satisfy the above conditions, it is a condition that the maximum value of the absolute value of sin (A sin $\omega_d t$–φ) in the equation (16) is 1, and the maximum value of the absolute value of cos (A sin $\omega_d t$–φ) in the equation (17) is 1. When this condition is satisfied, preprocessing by the preprocessing section 53 becomes possible, and finally demodulation process by the demodulation section 55 becomes possible. Therefore, this condition is called a "demodulatorable condition".

Summarizing the above, it is a demodulatorable condition that both the following equations (18) and (19) hold.

$$\max\{|\sin(A \sin \omega_d t - \phi)|\} = 1 \quad (18)$$

$$\max\{|\cos(A \sin \omega_d t - \phi)|\} = 1 \quad (19)$$

In order to establish this demodulatorable condition, the range of values of A sin $\omega_d t$–φ should be n or more. Here, the optical path phase difference φ cannot usually take any value. Then, in order for the range of values of A sin $\omega_d t$–ω to be n or more, it is required to satisfy the following equation, especially for A.

$$A = \frac{f_{dmax}}{f_d} \geq \frac{\pi}{2} \quad (20)$$

On the other hand, when the equation (20) does not hold, it means that the demodulatorable condition cannot be satisfied. Therefore, in the present embodiment, the optical system 50 is provided with a mechanism for changing the optical path phase difference φ so that the demodulatorable condition can be satisfied even when the equation (20) does not hold. Hereinafter, a method of satisfying the demodulatorable condition using this mechanism will be described.

4.6. Principle of Establishing Demodulatorable Condition

Here, in the laser interferometer 1 according to the present embodiment, the principle of establishing the above demodulatorable condition even when the equation (20) does not hold will be described.

Since A is a value that depends on the object 14 to be measured, A cannot be adjusted to a desired value when the optical path phase difference φ of the optical system 50 is fixed. Therefore, the optical system 50 shown in FIG. 2 is provided with the optical path length variable section 13. As described above, the optical path length variable section 13 is arranged on the optical path 22 and changes the optical path length of the optical path 22 through which the object light L3 propagates. When the optical path length of the optical path 22 changes, the optical path phase difference φ included in the above equations (11) and (14) becomes a function φ(t) of time. Therefore, the equations (11) and (14) are as follows.

$$I_{pass1} = -2J_1(B)\sin(\omega_m t)\sin(A \sin \omega_d t - \phi(t)) \quad (11-2)$$

$$I_{pass2} = J_2(B)\cos(\omega_m t)\cos(A \sin \omega_d t - \phi(t)) \quad (14-2)$$

In order for the above equations (11-2) and (14-2) to hold, it is desirable that, in the optical path length variable section 13, the optical path length reciprocates (vibrates) relatively slowly, that is, the frequency of vibration of the optical path length variable section 13 is sufficiently smaller than the frequency $f_d$ of the sample signal. Specifically, it is preferably about 10 Hz to 1 kHz.

When the movable optical element 132 of the optical path length variable section 13 is reciprocated at such a frequency, the optical path phase difference φ vibrates at that frequency. Then, even if the above equation (20) does not hold for A, the time when the demodulatorable condition is satisfied appears instantaneously.

Therefore, in the present embodiment, the amplitude of the first signal represented by the equation (11-2) is monitored in the first recording section 540 of FIG. 1. Then, when the maximum amplitude is reached, the value is recorded in the first recording section 540 as the first recording maximum amplitude. Further, the second recording section 541 of FIG. 1 monitors the amplitude of the second signal represented by the equation (14-2). Then, when the maximum amplitude is reached, the value is recorded in the second recording section 541 as the second recording maximum amplitude.

When the time when the first recording maximum amplitude is detected is $t_{p1}$ and the time when the second recording maximum amplitude is detected is $t_{p2}$, the above-mentioned demodulatorable condition is expressed as follows, and is satisfied at this moment.

$$\max\{|\sin(A \sin \omega_d t - \phi(t=t_{p1}))|\} = 1 \quad (18-2)$$

$$\max\{|\cos(A \sin \omega_d t - \phi(t=t_{p2}))|\} = 1 \quad (19-2)$$

The first recording maximum amplitude and the second recording maximum amplitude recorded as described above are temporarily recorded in the first recording section 540 and the second recording section 541. Then, when the sample signal derived from the object 14 to be measured is acquired, the recorded value is used to correct the first signal and the second signal. Thereby, even if the above equation (20) does not hold, the demodulation process in the demodulation circuit 52 becomes possible.

The laser interferometer 1 operates according to the above principle. Hereinafter, the operation mode of the laser interferometer 1 will be described.

4.7. Operation Mode of Laser Interferometer

As described above, the operation mode of the laser interferometer 1 includes a maximum amplitude recording mode and a measurement mode. Hereinafter, these will be described in order.

4.7.1. Maximum Amplitude Recording Mode

The control section 57 of the laser interferometer 1 controls the optical path length variable section 13 to operate when the maximum amplitude recording mode is selected. Then, the emission light L1 is emitted to the object 14 to be measured and the optical modulator 12 in a state where the optical path length variable section 13 is operated, that is, in a state where the movable optical element 132 is vibrated. Then, the optical path length of the optical path 22 through which the object light L3 propagates changes, and the amplitudes of the first signal and the second signal obtained from the light reception signal also change.

When the amplitude of the first signal reaches the maximum value at time $t_{p1}$, the first recording section 540 records the value as a first recording maximum amplitude $I_{Rmax1}$. When the amplitude of the second signal reaches the maximum value at time $t_{p2}$, the second recording section 541 records the value as a second recording maximum amplitude $I_{Rmax2}$. The first recording maximum amplitude $I_{Rmax1}$ and the second recording maximum amplitude $I_{Rmax2}$ are expressed as follows.

$$I_{Rmax1} = \max\{-2J_1(B)\sin(\omega_m t)\sin(A \sin \omega_d t - \phi(t=t_{p1}))\} \quad (11-3)$$

$$I_{Rmax2} = \max\{J_2(B)\cos(\omega_m t)\cos(A \sin \omega_d t - \phi(t=t_{p2}))\} \quad (14-3)$$

When the optical path length is changed by the optical path length variable section 13, the optical path length may be changed by an optical distance or more, where the optical distance corresponds to the wavelength of the emission light L1 (first laser light). Accordingly, the first recording maximum amplitude $I_{Rmax1}$ and the second recording maximum amplitude $I_{Rmax2}$ that satisfy the demodulatorable condition can be reliably recorded.

Specifically, the optical path length of the optical path 20 in FIG. 2 is $L_{01}$, and the optical path length of the optical path 22 is $L_{02}$. Then, when the difference between the optical distance of the path through which the reference light L2 propagates and the optical distance of the path through which the object light L3 propagates is L, L=2 ($L_{01}$–$L_{02}$).

On the other hand, when n is the refractive index of the medium and λ is the wavelength of the emission light L1, the initial phase is $2\pi L/\lambda$.

If L is $L_0$ when the initial phase of the laser interferometer 1 is 0 and L is $L_{2\pi}$ when the initial phase is $2\pi$, $2\pi n(L_{2\pi}-L_0)/\lambda = 2\pi$ and $n(L_{2\pi}-L_0)=\lambda$. Therefore, the optical path length $n(L_{2\pi}-L_0)$ to be changed by the optical path length variable section 13 may be equal to or more than the optical distance of the wavelength λ of the emission light L1.

4.7.2. Measurement Mode

When the measurement mode is selected, the control section 57 stops the operation of the optical path length variable section 13. In this state, the optical path phase difference φ is constant. Then, in this state, the emission light L1 is emitted to the object 14 to be measured and the optical modulator 12. In addition, the control section 57 controls the operation of the first recording section 540 to detect and record a maximum amplitude $I_{Mmax1}$ of the first signal obtained from the light reception signal. Further, the control section 57 controls the operation of the second recording section 541 to detect and record a maximum amplitude $I_{Mmax2}$ of the second signal obtained from the light reception signal. The maximum amplitude $I_{Mmax1}$ of the first signal and the maximum amplitude $I_{Mmax2}$ of the second signal in the measurement mode are expressed as follows.

$$I_{Mmax1}=\max\{-2J_1(B)\sin(\omega_m t)\sin(A\sin\omega_d t-\phi)\} \quad (11\text{-}4)$$

$$I_{Mmax2}=\max\{J_2(B)\cos(\omega_m t)\cos(A\sin\omega_d t-\phi)\} \quad (14\text{-}4)$$

At this time, the first recording section 540 calculates the ratio of the first recording maximum amplitude $I_{Rmax1}$ to the maximum amplitude $I_{Mmax1}$ as the correction coefficient $M_1$. Further, the second recording section 541 calculates the ratio of the second recording maximum amplitude $I_{Rmax2}$ the maximum amplitude $I_{Mmax2}$ as the correction coefficient $M_2$. The correction coefficient $M_1$ and the correction coefficient $M_2$ are expressed as follows.

$$\frac{I_{Rmax1}}{I_{Mmax1}} = \frac{\max\{-2J_1(B)\sin(\omega_m t)\sin(A\sin\omega_d t - \phi(t=t_{p1}))\}}{\max\{-2J_1(B)\sin(\omega_m t)\sin(A\sin\omega_d t - \phi)\}} = M_1 \quad (21)$$

$$\frac{I_{Rmax2}}{I_{Mmax2}} = \frac{\max\{J_2(B)\cos(\omega_m t)\cdot\cos(A\sin\omega_d t - \phi(t=t_{p2}))\}}{\max\{J_2(B)\cos(\omega_m t)\cdot\cos(A\sin\omega_d t - \phi)\}} = M_2 \quad (22)$$

Such a correction coefficient $M_1$ is multiplied by the first signal in the first AGC 542. Further, the correction coefficient $M_2$ is multiplied by the second signal in the second AGC 543. As a result, the first signal that has passed through the first AGC 542 and the second signal that has passed through the second AGC 543 are expressed as follows.

$$I_{pass1\text{-}AGC1}=-2J_1(B)\sin(\omega_m t)M_1 \sin(A\sin\omega_d t-\phi) \quad (11\text{-}5)$$

$$I_{pass2\text{-}AGC2}=J_2(B)\cos(\omega_m t)M_2 \cos(A\sin\omega_d t-\phi) \quad (14\text{-}5)$$

When the above correction is performed, the maximum amplitude of the first signal and the maximum amplitude of the second signal can be aligned with each other in the third AGC 544 and the fourth AGC 545 as described in the above-mentioned basic principle. As described above, in the third AGC 544, the first signal is multiplied by $1/(-2J_1(B))$. Further, in the fourth AGC 545, the second signal is multiplied by $1/J_2(B)$. As a result, the first signal that has passed through the third AGC 544 and the second signal that has passed through the fourth AGC 545 are expressed as follows.

$$I_{pass1\text{-}AGC3}=\sin(\omega_m t)M_1 \sin(A\sin\omega_d t-\phi) \quad (11\text{-}6)$$

$$I_{pass2\text{-}AGC4}=\cos(\omega_m t)M_2 \cos(A\sin\omega_d t-\phi) \quad (14\text{-}6)$$

As a result of aligning the maximum amplitudes as described above, by summing the first signal and the second signal in the summer 546 described above, unnecessary terms can be eliminated and necessary terms can be extracted as described above. As a result, even when the above equation (20) does not hold, the sample signal can be demodulated, and the displacement information and the velocity information can be measured.

In the above calculation process, the correction coefficients $M_1$ and $M_2$ are calculated, and the calculation of multiplying the first signal and the second signal is performed. Along with the calculation, there is an effect of canceling a device error given to the signal amplitude by the optical system 50, the demodulation circuit 52, or the like. Therefore, the present embodiment is also useful from the viewpoint that the influence of the device error on the measurement result can be reduced.

As described above, the laser interferometer 1 according to the present embodiment includes the light source 2, the optical modulator 12, the photodetector 10, and the optical path length variable section 13. The light source 2 emits the emission light L1 (first laser light). The optical modulator 12 includes the vibrator 30, and modulates the emission light L1 using the vibrator 30 to generate the reference light L2 (second laser light) including a modulated signal. The photodetector 10 receives interference light between the object light L3 (third laser light) including a sample signal, which is derived from the object 14 to be measured (object), generated by reflecting the emission light L1 on the object 14 to be measured and the reference light L2 to output a light reception signal. The optical path length variable section 13 changes the optical path length of the optical path 22 through which the object light L3 propagates.

According to such a configuration, even if the element depending on the object 14 to be measured, specifically the value of A described above, is an inappropriate value in the demodulation process in the demodulation circuit 52, the light reception signal can be corrected so as to satisfy the demodulatorable condition. Accordingly, the laser interferometer 1 capable of demodulating the sample signal in a wider band and calculating displacement information, velocity information, or the like can be realized. Further, since the volume of the vibrator 30 is very small and the electric power required for oscillation is also small, it is easy to reduce the size and power consumption of the laser interferometer 1.

Further, the laser interferometer 1 according to the present embodiment includes the polarization beam splitter 4 (optical path branching element) that branches the optical path 18 through which the emission light L1 (first laser light) propagates. The optical path length variable section 13 shown in FIG. 2 is arranged on the optical path 22 between the polarization beam splitter 4 and the object 14 to be measured (object).

According to such a configuration, since the optical path length variable section 13 can be arranged between the polarization beam splitter 4 and the object 14 to be measured, although it depends on the configuration of the optical system 50, a laser interferometer 1 useful from the viewpoint of ease of manufacture and maintainability for the optical path length variable section 13 can be obtained.

Further, the optical path length variable section 13 according to the present embodiment includes the movable optical element 132 that changes the optical path length by moving, and the drive portion 138 that drives the movable optical element 132.

According to such a configuration, the optical path length can be changed with high accuracy, and the change can be made in nm units. Therefore, the demodulation accuracy in the demodulation circuit 52 can be improved.

Further, the laser interferometer 1 according to the present embodiment includes the demodulation circuit 52. As described above, the demodulation circuit 52 includes a first signal path psi and a second signal path ps2 through which the light reception signal is passed. Then, the demodulation circuit 52 demodulates the sample signal from the first signal, which is alight reception signal that has passed through the first signal path psi, and the second signal, which is a light reception signal that has passed through the second signal path ps2.

Further, the demodulation circuit 52 has the first recording section 540, the second recording section 541, the first AGC 542 (first amplitude adjusting section), and the second AGC 543 (second amplitude adjusting section).

The first recording section 540 detects the maximum amplitude of the first signal, which is a light reception signal passing through the first signal path psi, and records it as the first recording maximum amplitude, in the maximum amplitude recording mode in which the optical path length is changed by the optical path length variable section 13. The second recording section 541 detects the maximum amplitude of the second signal, which is a light reception signal passing through the second signal path ps2, and records it as the second recording maximum amplitude, in the maximum amplitude recording mode in which the optical path length is changed by the optical path length variable section 13.

The first AGC 542 adjusts the maximum amplitude of the first signal passing through the first signal path psi in the measurement mode based on the first recording maximum amplitude. The second AGC 543 adjusts the maximum amplitude of the second signal passing through the second signal path ps2 in the measurement mode based on the second recording maximum amplitude.

According to such a configuration, even if the value of A described above is an inappropriate value in the demodulation process in the demodulation circuit 52, the light reception signal can be corrected so as to satisfy the demodulatorable condition with a relatively simple configuration. Further, when performing an operation for correcting the maximum amplitude of the signal detected in the measurement mode based on the maximum amplitude recorded in the maximum amplitude recording mode, since the device error given to the signal amplitude by the optical system 50 or the like can be canceled, the influence of the device error on the demodulation accuracy can be reduced.

5. Modification Example

Next, laser interferometers according to modification examples will be described.

Figure 13:
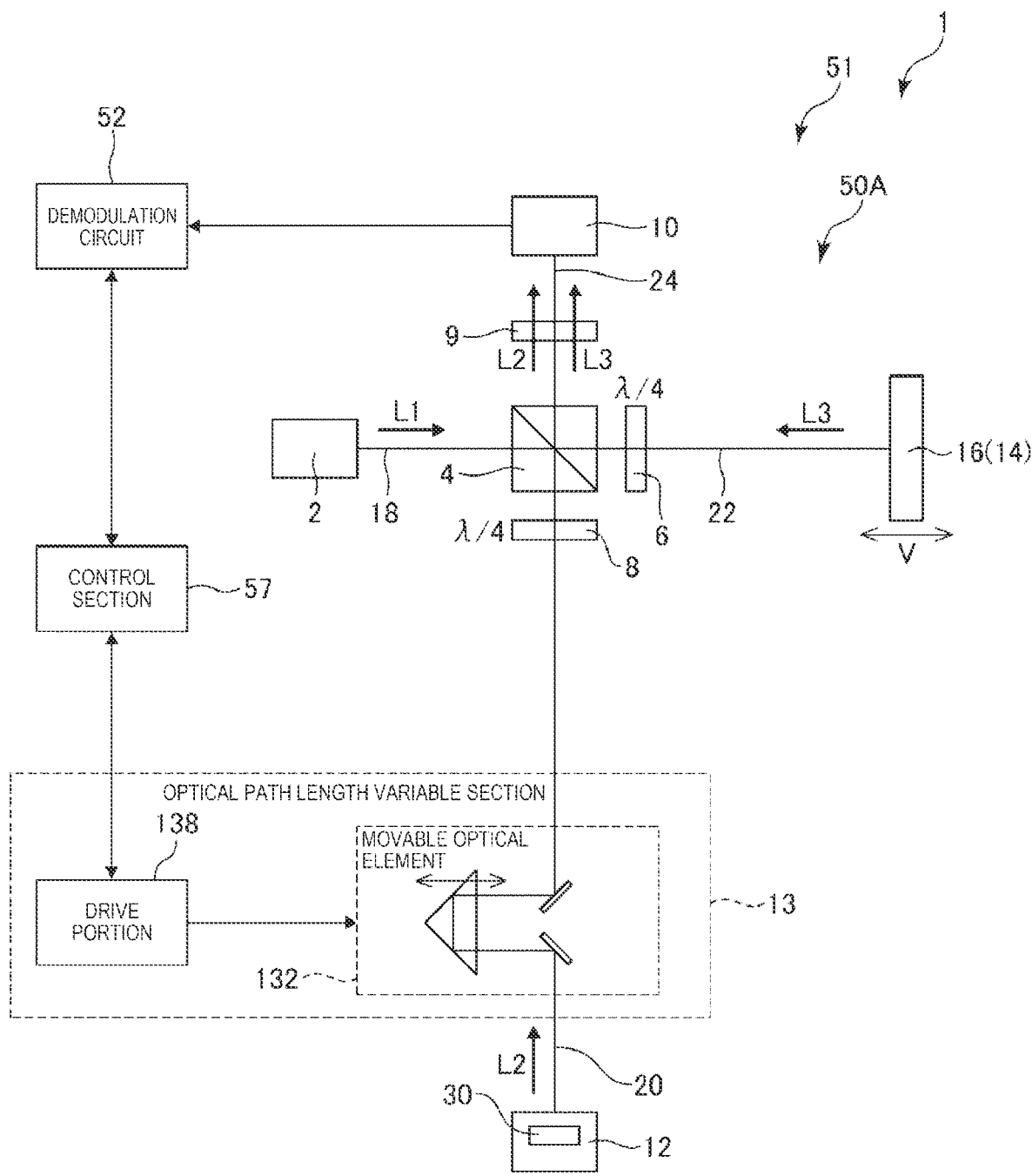
FIG. 13 is a schematic configuration diagram showing a mounting structure of an optical system included in a laser interferometer according to a first modification example.
Figure 14:
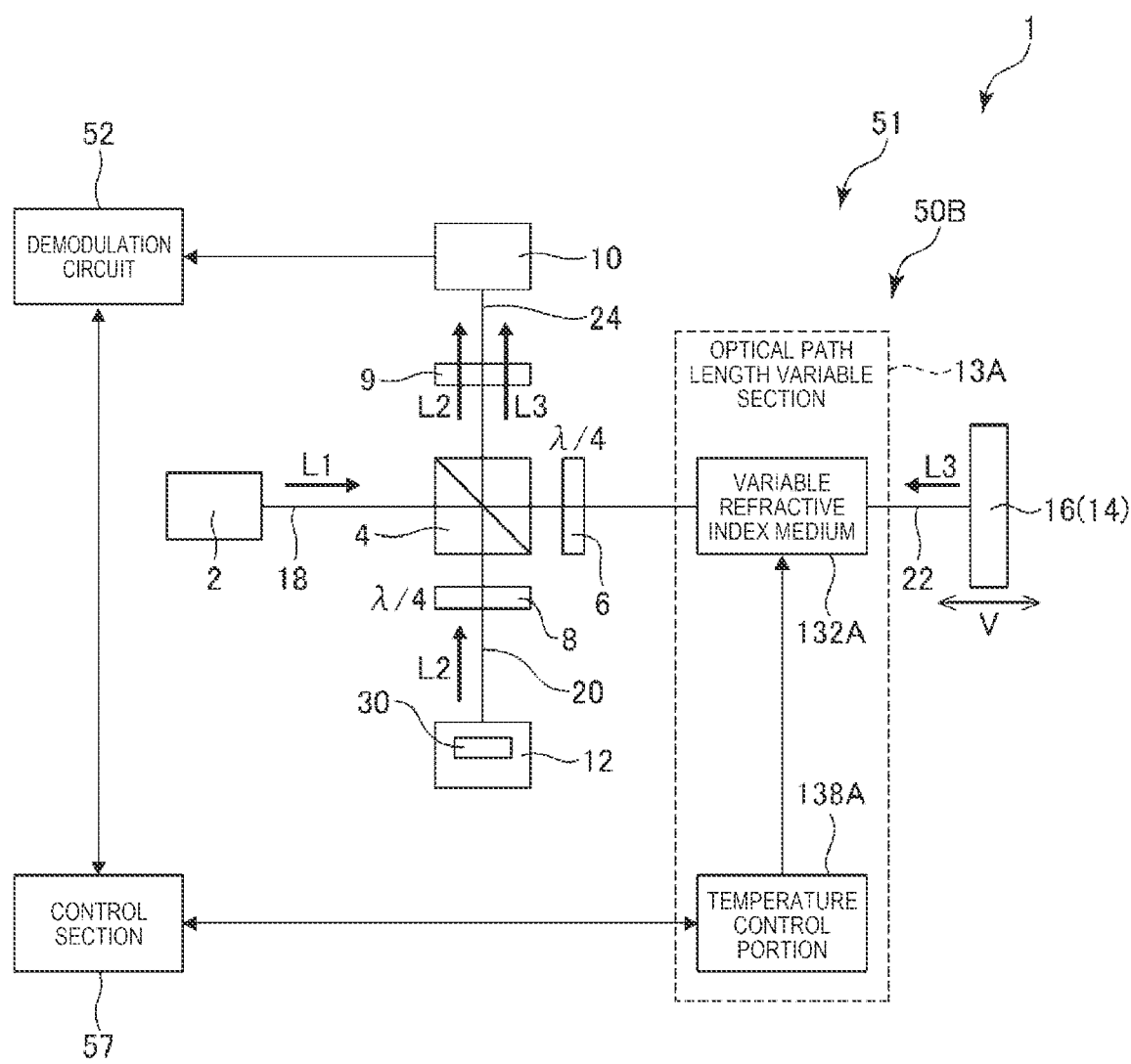
FIG. 14 is a schematic configuration diagram showing a mounting structure of an optical system included in a laser interferometer according to a second modification example.
Figure 15:
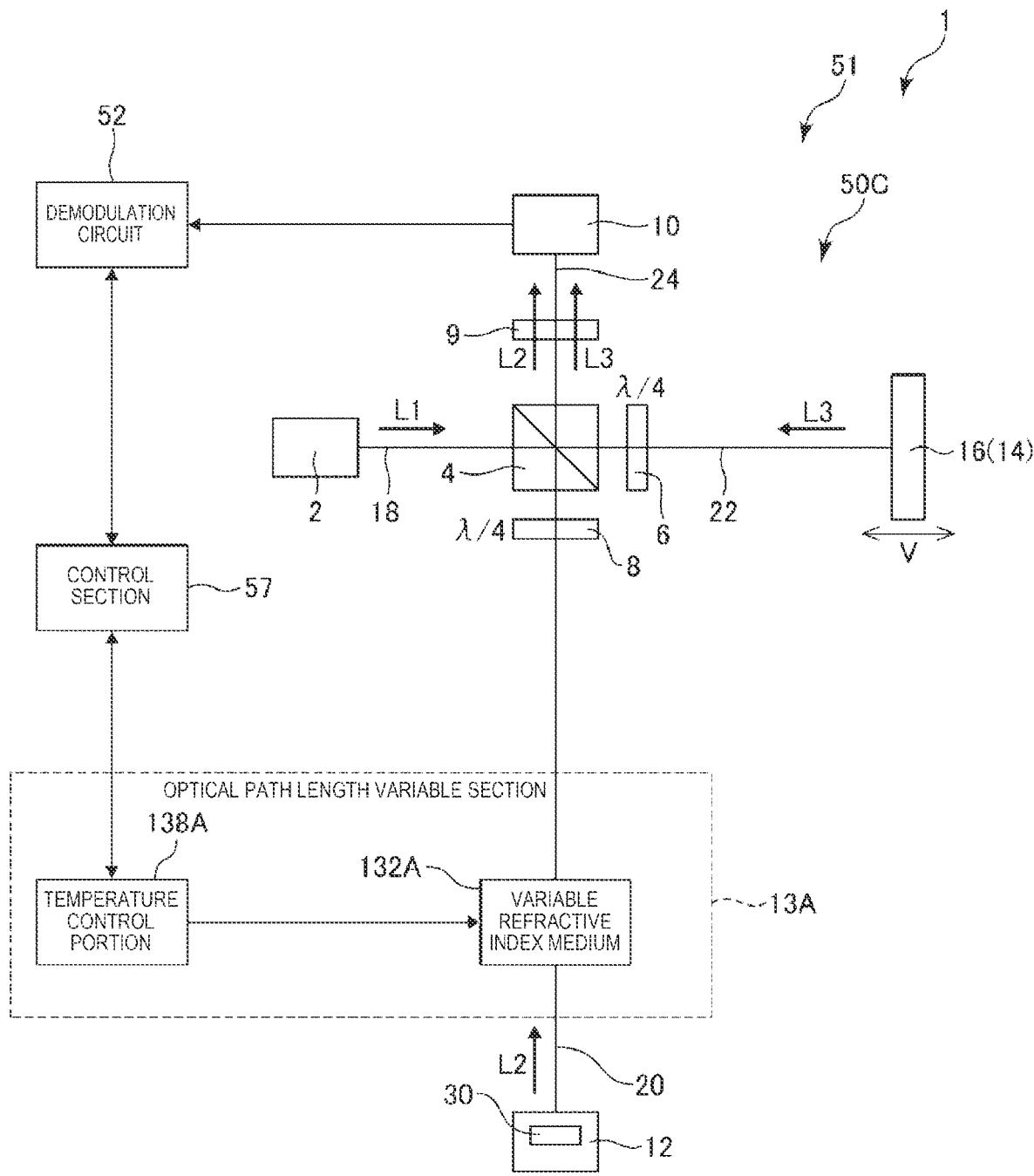
FIG. 15 is a schematic configuration diagram showing a mounting structure of an optical system included in a laser interferometer according to a third modification example.
Figure 16:
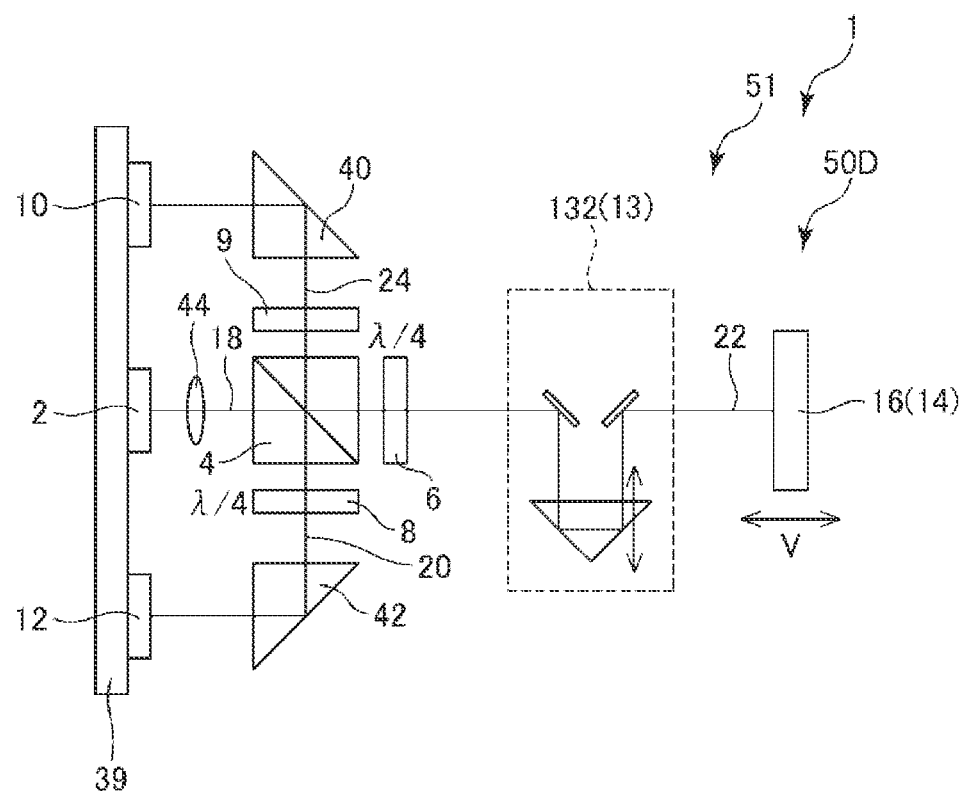
FIG. 16 is a schematic configuration diagram showing a mounting structure of an optical system included in a laser interferometer according to a fourth modification example.
Figure 17:
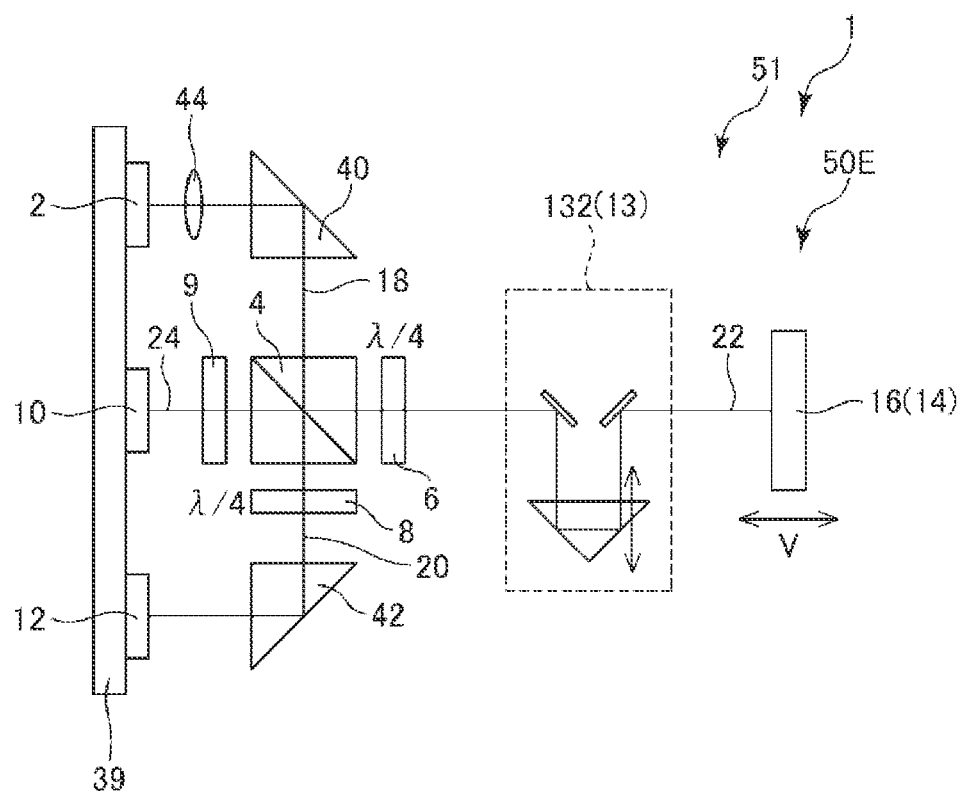
FIG. 17 is a schematic configuration diagram showing a mounting structure of an optical system included in a laser interferometer according to a fifth modification example.
Figure 18:
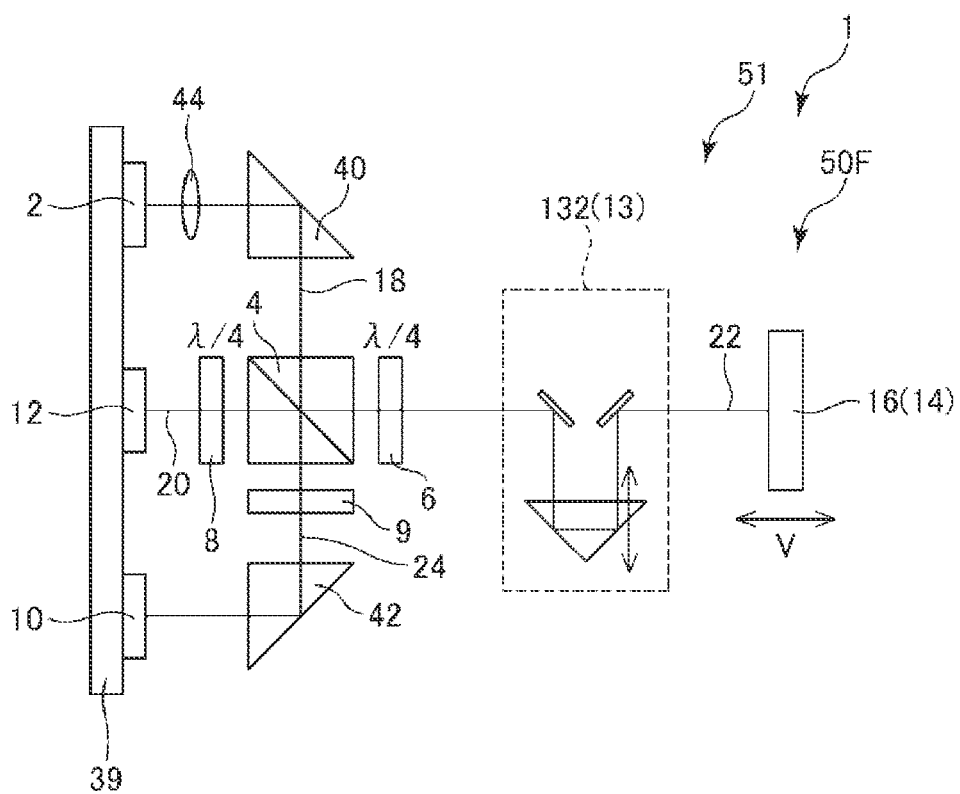
FIG. 18 is a schematic configuration diagram showing a mounting structure of an optical system included in a laser interferometer according to a sixth modification example.

FIG. 13 is a schematic configuration diagram showing a mounting structure of an optical system included in a laser interferometer according to a first modification example. FIG. 14 is a schematic configuration diagram showing a mounting structure of an optical system included in a laser interferometer according to a second modification example. FIG. 15 is a schematic configuration diagram showing a mounting structure of an optical system included in a laser interferometer according to a third modification example. FIG. 16 is a schematic configuration diagram showing amounting structure of an optical system included in a laser interferometer according to a fourth modification example. FIG. 17 is a schematic configuration diagram showing amounting structure of an optical system included in a laser interferometer according to a fifth modification example. FIG. 18 is a schematic configuration diagram showing a mounting structure of an optical system included in a laser interferometer according to a sixth modification example.

Hereinafter, modification examples will be described, but in the following description, the differences from the above-described embodiment will be mainly described, and the description of the same matters will be omitted. In FIGS. 13 to 18, the same reference numerals are given to the same configurations as those of the above-described embodiment.

An optical system 50A of a laser interferometer 1 shown in FIG. 13 is the same as the optical system 50 shown in FIG. 2, except that the arrangement of the optical path length variable section 13 is different.

In the above-described optical system 50 shown in FIG. 2, the optical path length variable section 13 is arranged on the optical path 22 between the polarization beam splitter 4 and the object 14 to be measured. In contrast, in the optical system 50A shown in FIG. 13, the optical path length variable section 13 is arranged on the optical path 20 between the polarization beam splitter 4 and the optical modulator 12.

According to such a configuration, since the optical path length variable section 13 can be arranged between the polarization beam splitter 4 and the optical modulator 12, although it depends on the configuration of the optical system 50A, a laser interferometer 1 useful from the viewpoint of ease of manufacture and maintainability for the optical path length variable section 13 can be obtained.

An optical system 50B of a laser interferometer 1 shown in FIG. 14 is the same as the optical system 50 shown in FIG. 2, except that the configuration of an optical path length variable section 13A is different.

The above-described optical path length changing method of the optical path length variable section 13 shown in FIG. 2 is a method of changing the optical path length by moving an optical component. In contrast, the optical path length changing method of the optical path length variable section 13A shown in FIG. 14 is a method of changing the refractive index of the medium through which the optical path 22 passes.

Specifically, the optical path length variable section 13A shown in FIG. 14 includes a variable refractive index medium 132A and a temperature control portion 138A that changes the temperature of the variable refractive index medium 132A. The variable refractive index medium 132A is a light-transmitting medium arranged on the optical path 22, and has a characteristic that the refractive index changes with a temperature change.

According to such a configuration, the optical path length of the optical path 22 can be changed without changing the physical distance of each portion constituting the optical path length variable section 13A. Therefore, in the optical system 50B, it is not necessary to provide a space for the volume change of the optical path length variable section 13A, so that the laser interferometer 1 can be further miniaturized.

Examples of the medium constituting the variable refractive index medium 132A include an inorganic material such as quartz glass and an organic material such as acrylic resin. The variable refractive index medium 132A may have a heat insulating structure that enhances the heat insulating property between the medium and the outside air, if necessary. Examples of the temperature control portion 138A include a heat exchange element such as a Peltier element.

The optical path length variable section 13A shown in FIG. 14 is arranged between the polarization beam splitter 4 and the object 14 to be measured. Therefore, although it depends on the configuration of the optical system 50B, a laser interferometer 1 useful from the viewpoint of ease of manufacture and maintainability for the optical path length variable section 13A can be obtained.

An optical system 50C of a laser interferometer 1 shown in FIG. 15 is the same as the optical system 50B shown in FIG. 14, except that the arrangement of the optical path length variable section 13A is different.

In the above-described optical system 50B shown in FIG. 14, the optical path length variable section 13A is arranged on the optical path 22 between the polarization beam splitter 4 and the object 14 to be measured. In contrast, in the optical system 50C shown in FIG. 15, the optical path length variable section 13A is arranged on the optical path 20 between the polarization beam splitter 4 and the optical modulator 12.

As described above, the laser interferometer 1 shown in FIG. 15 includes a light source 2, an optical modulator 12, a photodetector 10, and an optical path length variable section 13, and the optical path length variable section 13 changes the optical path length of the optical path 20 through which the reference light L2 propagates.

According to such a configuration, in addition to the above-mentioned effect, the effect that the optical path length variable section 13A can be arranged between the polarization beam splitter 4 and the optical modulator 12 can be obtained. Therefore, although it depends on the configuration of the optical system 50C, a laser interferometer 1 useful from the viewpoint of ease of manufacture and maintainability for the optical path length variable section 13A can be obtained.

An optical system 50D of a laser interferometer 1 shown in FIG. 16 includes a substrate 39. A light source 2, an optical modulator 12, and a photodetector 10 are each mounted on the substrate 39. Then, on the substrate 39 shown in FIG. 16, the photodetector 10, the light source 2, and the optical modulator 12 are arranged in this order along the direction orthogonal to the optical path 22 shown in FIG. 15.

Further, the optical system 50D shown in FIG. 16 includes prisms 40 and 42. The prism 40 is provided on an optical path 24 between the photodetector 10 and an optical analyzer 9. The prism 42 is provided on an optical path 20 between the optical modulator 12 and a quarter wave plate 8.

Further, the optical system 50D shown in FIG. 16 includes a convex lens 44. The convex lens 44 is provided on an optical path 18 between the light source 2 and a polarization beam splitter 4. By providing the convex lens 44, emission light L1 emitted from the light source 2 can be focused and effectively used.

The optical path length variable section 13 shown in FIG. 16 is arranged on the optical path 22 between the polarization beam splitter 4 and the object 14 to be measured.

An optical system 50E of a laser interferometer 1 shown in FIG. 17 is the same as the optical system 50D shown in FIG. 16, except that the arrangement of the elements and the like is different.

On a substrate 39 shown in FIG. 17, a light source 2, a photodetector 10, and an optical modulator 12 are arranged in this order in the direction orthogonal to an optical path 22 shown in FIG. 15. A prism 40 is provided on an optical path 18, and a prism 42 is provided on an optical path 20.

The optical path length variable section 13 shown in FIG. 17 is arranged on the optical path 22 between the polarization beam splitter 4 and the object 14 to be measured.

An optical system 50F of a laser interferometer 1 shown in FIG. 18 has an arrangement in which an optical modulator 12 is incorporated in an optical path connecting an object 14 to be measured and a photodetector 10.

On a substrate 39 shown in FIG. 18, a light source 2, an optical modulator 12, and a photodetector 10 are arranged in this order in the direction orthogonal to an optical path 22 shown in FIG. 15. A prism 40 is provided on an optical path 18, and a prism 42 is provided on an optical path 24.

The optical path length variable section 13 shown in FIG. 18 is arranged on the optical path 22 between the polarization beam splitter 4 and the object 14 to be measured.

According to the mounting structures shown in FIGS. 16 to 18 as described above, the size of the laser interferometer 1 can be easily reduced. The arrangement of the elements is not limited to the arrangement shown in the drawings.

In the mounting structures shown in FIGS. 16 to 18, the size of the photodetector 10 is, for example, 0.1 mm square, the size of the light source 2, is, for example, 0.1 mm square, and the size of the optical modulator 12 is, for example, 0.5 to 10 mm square. The size of the substrate 39 on which these elements are mounted is, for example, 1 to 10 mm square. Thereby, the size of the laser interferometer 1 can be reduced to about the size of the substrate 39.

Even in the above-mentioned modification example, the same effect as that of the above-described embodiment can be obtained.

Although the laser interferometer according to the present disclosure has been described above based on the illustrated embodiment, the laser interferometer according to the present disclosure is not limited to the above-described embodiment, and the configuration of each section can be replaced with any configuration having the same function. Further, any other component may be added to the laser interferometer according to the embodiment. Moreover, the embodiment of the present disclosure may include any two or more of the embodiment and each of the modification examples.

What is claimed is:
1. A laser interferometer, comprising:
a light source configured to emit a first laser light;
a beam splitter configured to split the first laser light into a first polarized light and a second polarized light;
an optical modulator that includes a vibrator, wherein
the optical modulator is configured to modulate the first polarized light by using the vibrator to generate a second laser light including a modulated signal,
the second polarized light is reflected by an object to be measured, and the reflected second polarized light generates a third laser light including a sample signal;
a photodetector configured to receive an interference light to output a light reception signal, wherein the interference light is between the third laser light and the second laser light;
an optical path length variable section configured to change an optical path length of an optical path through which the third laser light propagates, wherein
the optical path of the third laser light is between the object and the photodetector via the beam splitter,
the optical path length is one of equal to or more than an optical distance, and
the optical distance corresponds to a wavelength of the first laser light, a controller configured to control the optical path length variable section; and
a demodulation circuit that includes a first signal path and a second signal path, wherein the demodulation circuit is configured to:
demodulate the sample signal from a first light reception signal that is the light reception signal passed through the first signal path and a second light reception signal that is the light reception signal passed through the second signal path;
detect a maximum amplitude of the first light reception signal and record the detected maximum amplitude as a first recording maximum amplitude when the optical path length is changed by the optical path length variable section;
detect a maximum amplitude of the second light reception signal and record the detected maximum amplitude as a second recording maximum amplitude when the optical path length is changed by the optical path length variable section;
adjust the maximum amplitude of the first light reception signal based on the first recording maximum amplitude; and
adjust the maximum amplitude of the second light reception signal based on the second recording maximum amplitude.

2. The laser interferometer according to claim 1, wherein the optical path length variable section is disposed on an optical path between the beam splitter and the object.

3. The laser interferometer according to claim 1, wherein the optical path length variable section includes a movable optical element and a drive portion,
the movable optical element includes at least two mirrors and a prism,
the movable optical element is configured to change the optical path length by moving, and
the drive portion is configured to drive the movable optical element.

4. The laser interferometer according to claim 1, wherein the optical path length variable section includes a variable refractive index medium and a temperature control portion,
the variable refractive index medium is configured to change a refractive index with a temperature change, and
the temperature control portion is configured to change a temperature of the variable refractive index medium.

5. A laser interferometer, comprising:
a light source configured to emit a first laser light;
a beam splitter configured to split the first laser light is split into a first polarized light and a second polarized light;
an optical modulator that includes a vibrator, wherein
the optical modulator is configured to modulate the first polarized light by using the vibrator to generate a second laser light including a modulated signal,
the second polarized light is reflected by an object to be measured, and
the reflected second polarized light generates a third laser light including a sample signal;
a photodetector configured to receive an interference light to output a light reception signal, wherein the interference light is between the third laser light and the second laser light;
an optical path length variable section configured to change an optical path length of an optical path through which the second laser light propagates, wherein
the optical path of the second laser light is between the optical modulator and the photodetector via the beam splitter,
the optical path length is one of equal to or more than an optical distance, and
the optical distance corresponds to a wavelength of the first laser light;
a demodulation circuit that includes a first signal path and a second signal path, wherein the demodulation circuit is configured to:
demodulate the sample signal from a first light reception signal that is the light reception signal passed through the first signal path and a second light reception signal that is the light reception signal passed through the second signal path;
detect a maximum amplitude of the first light reception signal and record the detected maximum amplitude as a first recording maximum amplitude when the optical path length is changed by the optical path length variable section;
detect a maximum amplitude of the second light reception signal and record the detected maximum amplitude as a second recording maximum amplitude when the optical path length is changed by the optical path length variable section;
adjust the maximum amplitude of the first light reception signal based on the first recording maximum amplitude; and
adjust the maximum amplitude of the second light reception signal based on the second recording maximum amplitude.

6. The laser interferometer according to claim 5, wherein the optical path length variable section is disposed on an optical path between the beam splitter and the optical modulator.

7. The laser interferometer according to claim 5, wherein the optical path length variable section includes a movable optical element and a drive portion,
the movable optical element includes at least two mirrors and a prism,
the movable optical element is configured to change the optical path length by moving, and
the drive portion is configured to drive the movable optical element.

8. The laser interferometer according to claim 5, wherein the optical path length variable section includes a variable refractive index medium and a temperature control portion,
the variable refractive index medium is configured to change a refractive index with a temperature change, and the temperature control portion is configured to change a temperature of the variable refractive index medium.

* * * * *